United States Patent
Kneen et al.

(10) Patent No.: US 10,459,986 B2
(45) Date of Patent: Oct. 29, 2019

(54) MULTI-IDENTIFIER USER PROFILING SYSTEM

(71) Applicant: PAYPAL, INC., San Jose, CA (US)

(72) Inventors: Ben Kneen, Boston, MA (US); Ajay Gupta, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 1068 days.

(21) Appl. No.: 13/931,278

(22) Filed: Jun. 28, 2013

(65) Prior Publication Data
US 2015/0006529 A1    Jan. 1, 2015

(51) Int. Cl.
*G06F 16/951* (2019.01)
*G06Q 20/02* (2012.01)
*G06Q 30/02* (2012.01)
*G06F 16/335* (2019.01)

(52) U.S. Cl.
CPC .......... *G06F 16/951* (2019.01); *G06F 16/337* (2019.01); *G06Q 20/02* (2013.01); *G06Q 30/02* (2013.01)

(58) Field of Classification Search
CPC ..... G06F 16/951; G06F 16/337; G06Q 20/02; G06Q 30/02
USPC ........................................................ 707/736
See application file for complete search history.

(56) References Cited

U.S. PATENT DOCUMENTS

| | | | |
|---|---|---|---|
| 7,269,853 B1* | 9/2007 | Dunn | H04L 63/102 726/27 |
| 7,428,750 B1* | 9/2008 | Dunn | G06F 21/41 726/8 |
| 8,121,891 B2* | 2/2012 | Handel | G06F 9/4443 705/14.4 |
| 9,203,905 B1* | 12/2015 | Hong | H04L 67/14 |
| 2003/0149781 A1* | 8/2003 | Yared | G06F 21/41 709/229 |
| 2006/0021017 A1* | 1/2006 | Hinton | H04L 63/0815 726/10 |
| 2006/0048216 A1* | 3/2006 | Hinton | H04L 63/0815 726/8 |

(Continued)

OTHER PUBLICATIONS

"An Overview of the Internet". Merriam-Webster Dictionary. p. 699. Published 2005. ISBN 978-0-87779-636-7. (Year: 2005).*
http://acceptingpayments.quora.com/Clinkle%E2%80%99s-Aerolink-A-Sound-That-Can%E2%80%99t-Be-Heard-But-Can-Pay.

*Primary Examiner* — Robert W Beausoliel, Jr.
*Assistant Examiner* — Arthur Ganger
(74) *Attorney, Agent, or Firm* — Haynes and Boone, LLP

(57) ABSTRACT

Systems and methods for profiling a user include providing a user account to a user and, in response, storing a user account identifier in association with the user account in a database. First user data is then received that is associated with the user account identifier and that includes activity associated with the user account, and the first user data is association with the user account in the database. Subsequent user data is then received that includes information about the user and that is associated with additional user identifiers and the user account identifier and, in response, the additional user identifiers are association with the user account identifier and each other in the database, and the additional user data is associated with the user account in the database. A user profile may then be creating using the first user data, the second user data, and the third user data.

20 Claims, 13 Drawing Sheets

(56) References Cited

U.S. PATENT DOCUMENTS

| | | | |
|---|---|---|---|
| 2006/0218628 A1* | 9/2006 | Hinton | H04L 63/0815 726/8 |
| 2006/0236382 A1* | 10/2006 | Hinton | H04L 63/0815 726/8 |
| 2007/0100978 A1* | 5/2007 | Levi | H04L 12/5855 709/223 |
| 2010/0281044 A1* | 11/2010 | Gupta | G06Q 30/02 707/765 |
| 2012/0051187 A1 | 3/2012 | Paulson | |
| 2012/0170575 A1* | 7/2012 | Mehra | H04L 41/00 370/359 |
| 2012/0173373 A1* | 7/2012 | Soroca | G06F 17/30867 705/26.3 |
| 2012/0173379 A1* | 7/2012 | Soroca | G06Q 30/08 705/26.3 |
| 2012/0290707 A1* | 11/2012 | Ennis | H04L 43/10 709/224 |
| 2013/0091058 A1* | 4/2013 | Huster | G06Q 20/322 705/44 |
| 2013/0124330 A1* | 5/2013 | Doughty | G06Q 30/0269 705/14.66 |
| 2013/0124331 A1* | 5/2013 | Doughty | G06Q 30/0269 705/14.66 |
| 2013/0124332 A1* | 5/2013 | Doughty | G06Q 30/0269 705/14.66 |
| 2013/0268277 A1 | 10/2013 | Duplan | |
| 2013/0290187 A1* | 10/2013 | Itwaru | G06Q 20/3227 705/44 |
| 2013/0290234 A1* | 10/2013 | Harris | G06N 5/022 706/46 |
| 2013/0339498 A1* | 12/2013 | Johnson | H04W 4/02 709/221 |
| 2014/0187239 A1* | 7/2014 | Friend | H04L 29/08 455/426.1 |
| 2014/0337089 A1* | 11/2014 | Tavares | G06Q 30/0201 705/7.29 |
| 2015/0006529 A1* | 1/2015 | Kneen | G06F 17/30864 707/736 |
| 2015/0161585 A1* | 6/2015 | Huster | G06Q 20/3224 705/44 |

\* cited by examiner

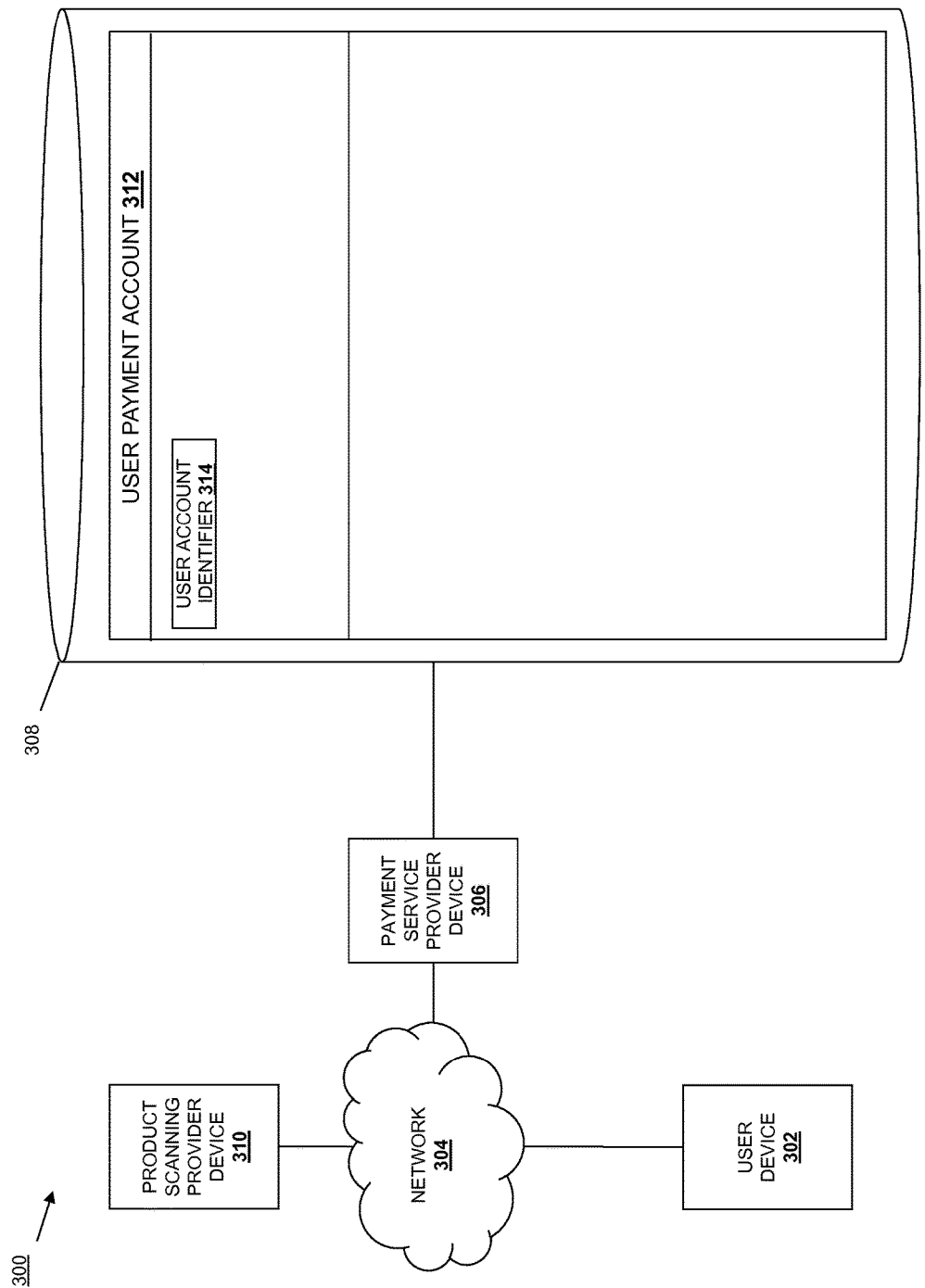

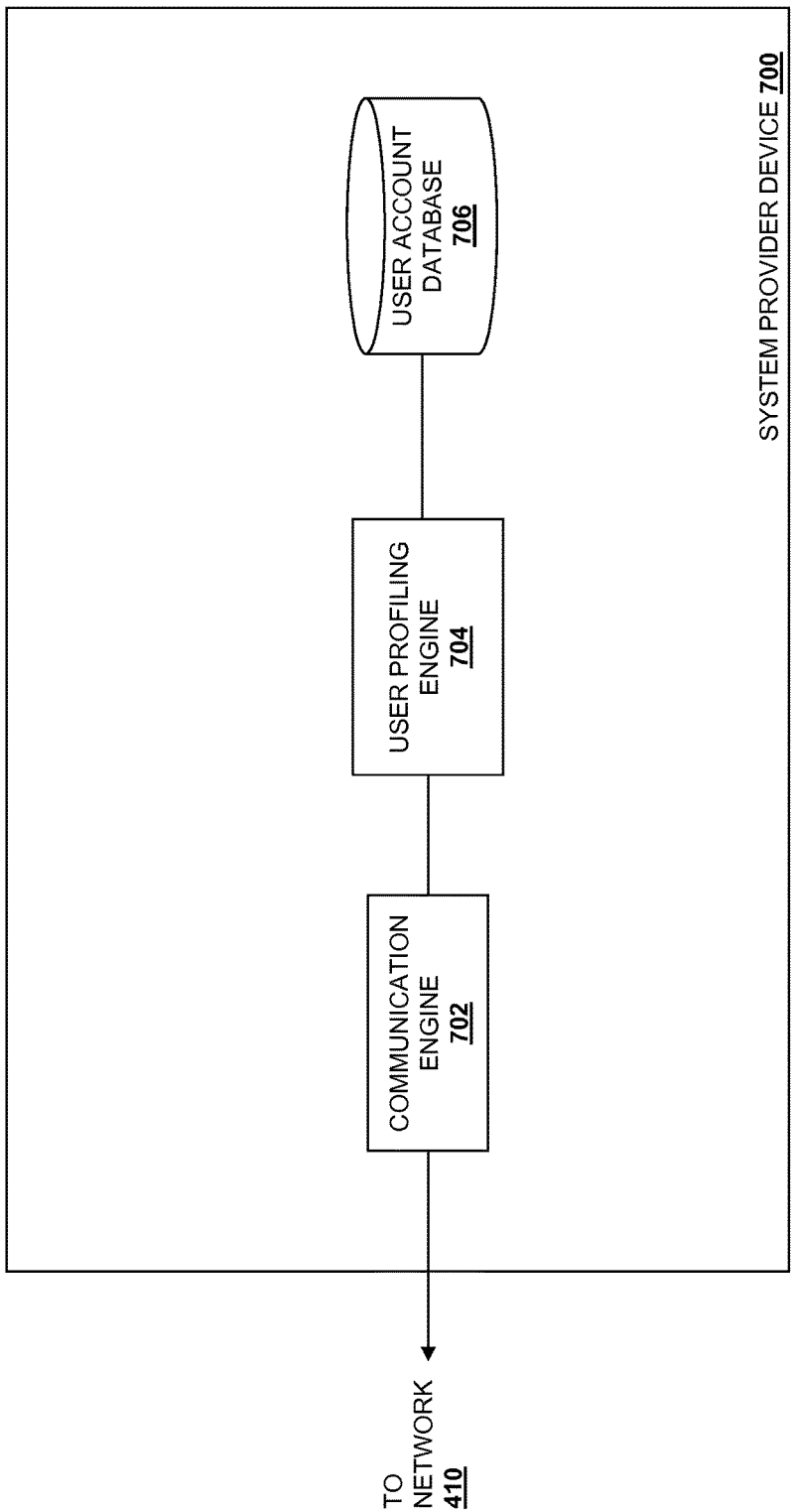

MULTI-IDENTIFIER USER PROFILING SYSTEM

BACKGROUND

Field of the Invention

The present invention generally relates to online and/or mobile payments and more particularly to a multi-identifier user profiling systems that may be used with online and/or mobile payment systems.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

It is sometimes desirable in conventional online systems to profile users of the online system in order to, for example, group users based on characteristics of those users such that groups of users may be targeted with regard to advertising and/or offers. For example, a payment account provider or payment service provider may profile a user based on purchases made by that user using a payment account or payment service, and then may target that user or a groups of users with advertising and/or offers based on that user or group of users making purchases that are associated with the advertising and/or offers. In another example, a website provider may target a user by providing a "cookie" on a user's browser application when the user visits the website provider's website, and that cookie operates to track the users actions associated with the web browser and reports user activity back to the website provider when the user revisits the website provider's website. Such activity may also be used to target the user with advertising and/or offers.

Such conventional user profiling results in the creation of discrete user profiles (e.g., a first user profile associated with purchasing activities, a second user profile associated with web browsing activities) that may actually be associated with the same user, but that are treated as separate user profiles. Furthermore, with regard to profiles created via cookies provided on web browser applications, some web browser applications (e.g., mobile device web browser applications) operate to block cookies, or otherwise prevent linking (e.g., "calls") between a website the user is visiting and a website of a website provider that wishes to be informed on the activities of that user. Such blocking prevents website providers from determining activity of users on any website but their own, prevents website providers from targeting users on other websites based on user profiles they've created, and prevents accurate user activity records from being compiled (e.g., by preventing a website provider from determining how many times an advertisement has been provided to a user on other websites.)

Thus, there is a need for improved user profiling systems and methods.

BRIEF DESCRIPTION OF THE FIGURES

FIG. 3a is a schematic view illustrating an embodiment of a user profiling system including a user payment account identifier associated with a user payment account in a database;

FIG. 7 is a schematic view illustrating an embodiment of a system provider device.

Figure 1:
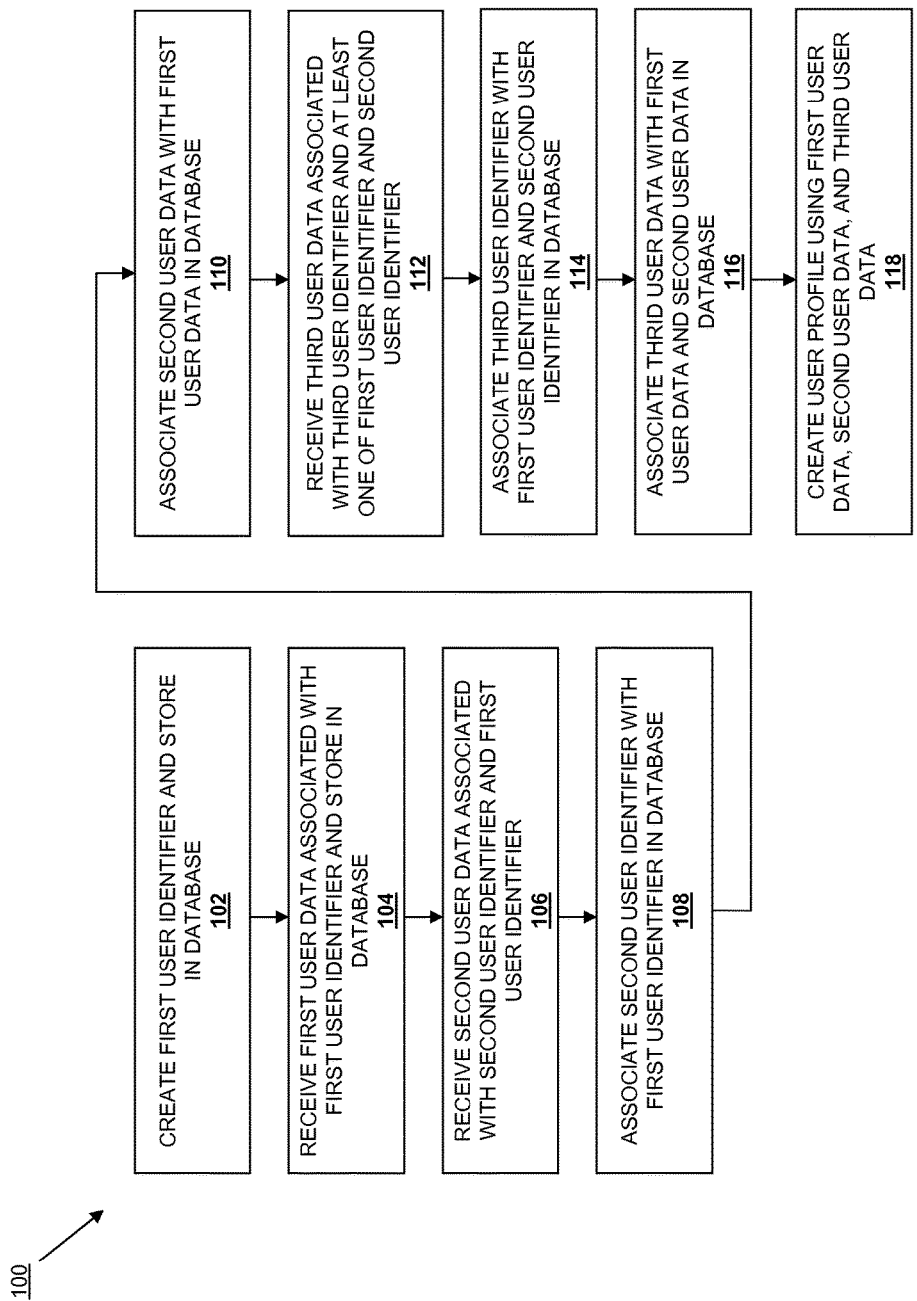
FIG. 1 is a flow chart illustrating an embodiment of a method for profiling a user.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a system and method for profiling users that collects and links multiple identifiers for a user, which may be provided from a plurality of different sources, and that each may be associated with different sets of user data. For example, a user may create a user payment account with a payment service provider such as, for example, PayPal, Inc. of San Jose, Calif., for use in making purchases from merchants. In the process of creating that user payment account, a user payment account identifier may be created that may include a variety of information about the user payment account and the user. For example, the user payment account identifier may include a payment account number associated with the user payment account, as well as any information provided by the user in creating the user account such as, for example, a user email address, a user home address, a user phone number, a user business address, a user financial account number, a user gender, a user social media account address, and/or a variety other information known in the art that is provided by users in setting up a payment account. The user may then use the user payment account to make purchases, and first user data associated with those purchases may be associated with the user payment account in a database.

Subsequent to creating the user payment account, the user may conduct other activities that generate second user data that is associated with a second user identifier (i.e., relative to the user account identifier.) For example, the user may add a mobile payment application (e.g., associated with the user payment account created as discussed above) to their mobile user device, and in the process of setting up that mobile payment application, may enter the user payment account identifier for their user payment account, a user email address, or other information included in or associated with the user payment account identifier. During the process of setting up the mobile payment application on the mobile user device, the payment service provider will receive that information that is included in or associated with the user payment account identifier, as well as a second user identifier that in this example may be a mobile user device identification for the mobile user device (e.g., a phone number, a device serial number, a subscriber identity module (SIM) card number, etc.) The payment service provider may then associate the second user identifier with the user account identifier in a database. Second user data that is related to the mobile user device may then be associated with the user payment account in the database. For example, user mobile device locations (e.g., via a location determination device such as a Global Positioning System (GPS) device), mobile device application or movie downloads, mobile user device usage data, and/or a variety of other mobile user device activity by the user may be retrieved from the mobile user device and associated with the user payment account in the database.

In another example of user activities subsequent to the creating of the user payment account, the user may generate user data associated with a third user identifier by making an online purchase with the user payment account using a web browser application on their home computer. In the process of enabling the purchase, the payment service provider may receive the user account information along with a third user identifier that in this example may be a user browser application identification that identifies the browser application used by the user (e.g., a "cookie") The payment service provider may then associate the third user identifier with the user account identifier and the user account in the database. Third user data that is related to the browser application may then be associated with the user payment account in the database. For example, websites visited, plug-ins added to the browser application, and/or a variety of other browser application activity by the user may be retrieved from the browser application and associated with the user payment account in the database.

Thus, user activity related to the payment service provider (e.g., via the user payment account, mobile payment application, and payment activities associated with a browser application discussed above) may result in the association of different user data (e.g., mobile user device activity data, browser application activity data, etc.) generated from a plurality of different user activities associated with different user identifiers (e.g., identifiers for the mobile user device and the browser application.) The association of the different user identifiers allows user data generated via user activities that are not related to the payment service provider. For example, browser application activity by a user that is associated with a website and that is not typically available to the payment service provider may be shared with the payment service provider by the website provider of that website simply by providing the user browser application identification along with the browser application activity, and that browser application activity may then be associated with the user using the browser application identification.

In addition, new user identifiers and user data may be obtained from third parties based on the user identifiers already associated with the user payment account in the database. For example, the user may include a user mobile device scanning application (e.g., RedLaser®) on their mobile user device, and that user mobile device scanning application may be associated with a mobile user device identifier, a scanning account number, a user email identifier, and/or product scanning data (e.g., stock keeping unit (SKU) or universal product code (UPC) data.) That information may be provided to the payment service provider, which may then identify the user payment account via the user email identifier (i.e., information included in or associated with the user payment account identifier), associate the scanning account number (i.e., a new user identifier) with the other user identifiers for that user in the database, and associate the product scanning data (i.e., fourth user data) with the user account. As would be appreciated by one of skill in the art in possession of the present disclosure, conventionally discrete data sets generated by the same user may be retrieved from a plurality of different sources and combined in this manner.

Furthermore, data sets may be collected that are not associated with a known user, and then may be associated with the user that generated those data sets once that user becomes known. For example, an unknown user may generate browsing data via a browsing application, or purchase activity via a mobile device. They payment service provider may receive this user data (e.g., from a third party source) and determine that it is not associated with a user having a user payment account with the payment service provider. However, rather than discarding that data, it may be stored in a database (e.g., the browsing data may be stored in the database in association with the browsing application identification, and the purchase data may be stored in the database in association with a mobile device identification of the mobile user device. Subsequent to the payment service provider storing that data, the user that generated that data may create a user payment account with the payment service provider. If during the creation of that user payment account, a browser is used that includes the browser application identification, and/or a mobile user device that includes the mobile user device identification are retrieved, the user data for the previously unknown user may be associated with the now-known user who just created the user payment account.

The collection of these conventionally discrete data sets generated by a user allows for the profiling of users in a more complete manner than is possible with conventional systems. For example, user profiles may be created including a wide variety of user activity data that is associated with the user account in the database, including purchase histories, income level, marital status, family status, hobbies, interests, merchants frequented, merchants not frequented, personal habits, and/or any other user characteristic discernible from the conventionally discrete data sets associated with the user account in the database according to the teachings of the present disclosure. User group profiles may also be created that include users that share characteristics. For example, users for whom user data has been retrieved that includes data indicating that the users area female that are between 18-30 years old (e.g., when signing up for a payment service provider account), and who then scans baby products (e.g., cribs, strollers, etc.) using a product scanning application and/or browse baby products over the Internet may then be associated with a user group profile of "mothers", even if no user data is received for those users about their children. Those user profiles and user group profiles may then be used for marketing, advertising, or other purposes.

Figure 2A:
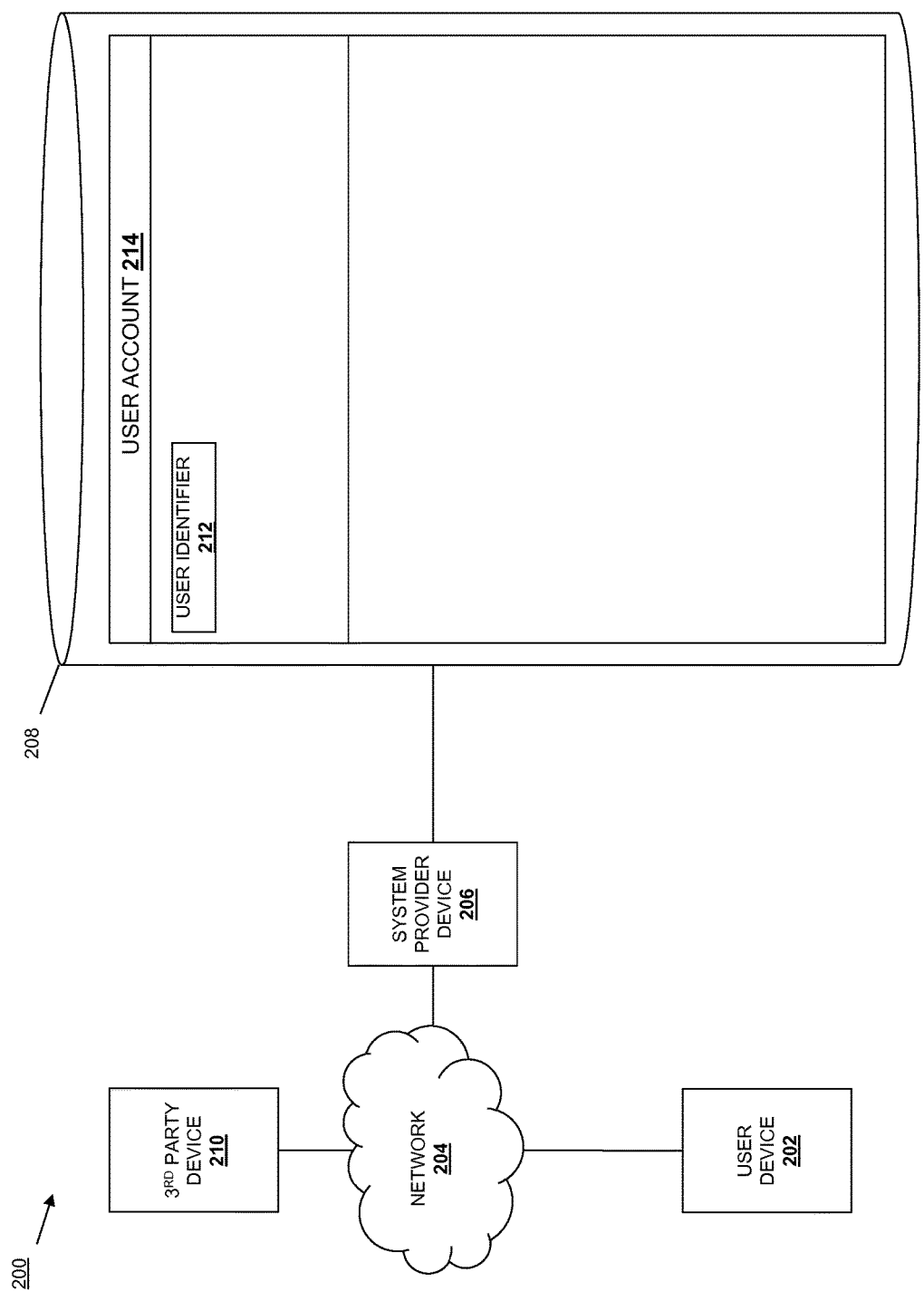
FIG. 2a is a schematic view illustrating an embodiment of a user profiling system including a user identifier associated with a user account in a database.
Figure 2B:
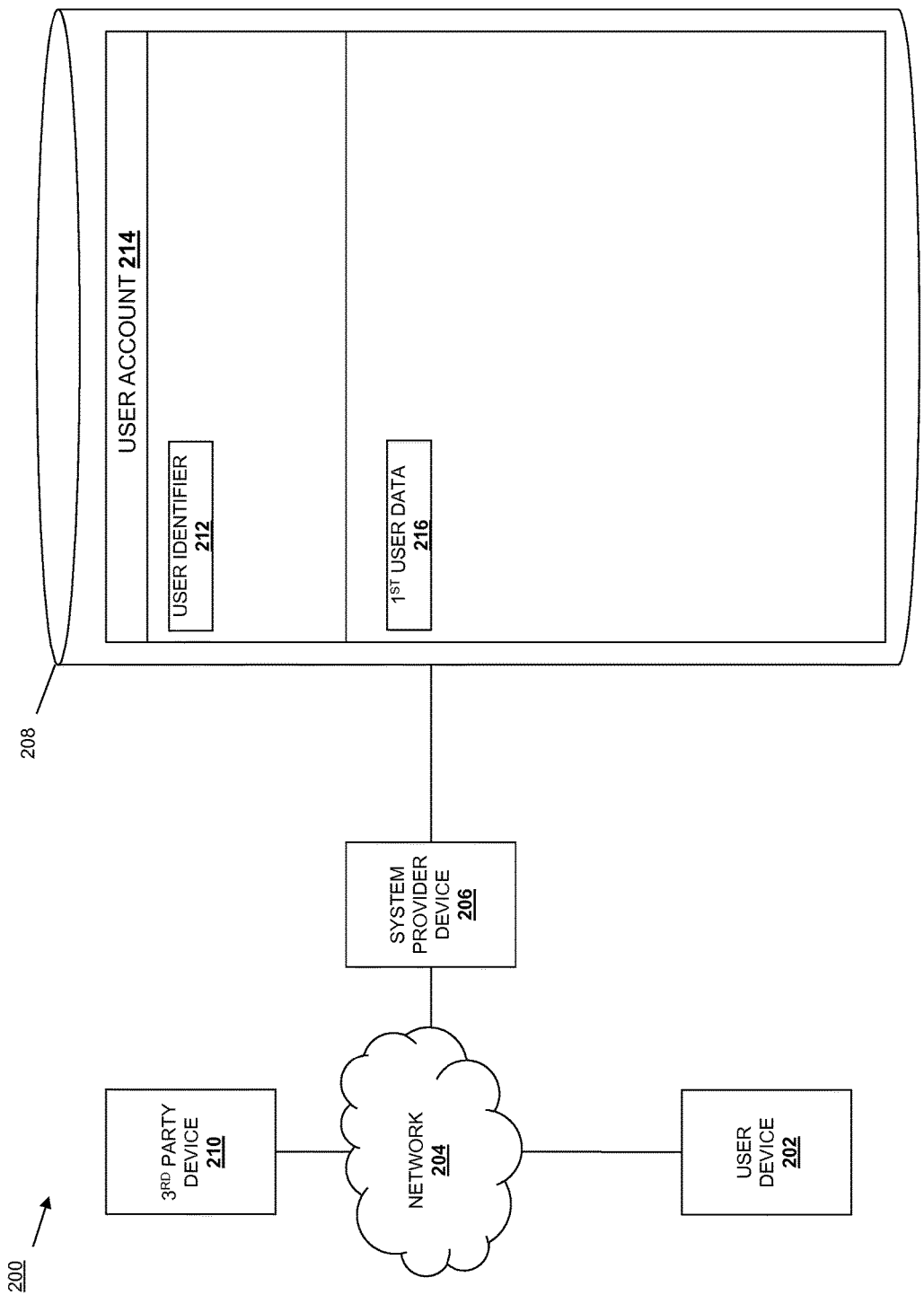
FIG. 2b is a schematic view illustrating an embodiment of the user profiling system of FIG. 2a including first user data associated with the user account in the database.

Referring now to FIGS. 1, 2a, and 2b, an embodiment of a method 100 for profiling a user is illustrated. In specific embodiments discussed below with regard to FIGS. 3a-3d, the multi-identifier user profiling system 300 is provided by a system provider device operated by a payment service provider such as, for example, PayPal, Inc. of San Jose, Calif., that provider user payment accounts for assisting in making payments from users to merchants (e.g., by transferring funds between a financial account of the user to a financial account of the merchant.) However, in other embodiments, the system provider device may be operated by any other entity that would like to profile its users, and/or by a third party system provider that profiles users for a variety of different entities.

The method 100 begins at block 102 where a first user identifier is created and stored in a database. FIGS. 2a-2d illustrate a multi-identifier user profiling system 200 that includes a user device 202 (e.g., a desktop computer, a mobile computer, etc.) connected to a network 204 (e.g., the Internet.) A system provider device 206 is connected to the network 204 and to a database 208. A $3^{rd}$ party device 210 is connected to the network 204. FIGS. 3a-3d illustrate a specific embodiment of a multi-identifier user profiling system 300 that includes a user device 302 (e.g., a desktop computer, a mobile computer, etc.) connected to a network 304 (e.g., the Internet.) A payment service provider device 306 is connected to the network 304 and to a database 308. A product scanning provider device 310 is connected to the network 304.

In the multi-identifier user profiling system 200 illustrated in FIGS. 2a-2d, at block 102 of the method 100, a user identifier 212 is created by the system provider device 206 and stored in the database 208, as illustrated. In some embodiments, the user identifier 212 created at block 102 may be for a user that is unknown to the system provider device 206 (e.g., a user identifier 212 that is not associated with a known user account stored in the database 208.) First user identifiers from unknown users may be created by the system provider device 206 following communications with the user device 202 in which a user identifier 212 is received. For example, a browser application on the user device 202 may be used to browse a website monitored or controlled by the system provider device 206, and at block 102, a browser application identification associated with that browser application may be received as the user identifier 212. In another example, the user device 202 may be a mobile user device that is used to access data from the system provider device 206 or a system monitored by the system provider device 206, and at block 102, a mobile device identification associated with the mobile user device 202 may be received as the user identifier 212. In another example, the user device 202 may be used to provide an email address to the system provider device 206 or a website monitored by the system provider device 206 (e.g., to sign up for a newsletter), and at block 102, that email address may be received as the user identifier 212.

First user identifiers from unknown users may also be received by the system provider device 206 from the $3^{rd}$ party device 210. For example, the $3^{rd}$ party may have collected browsing activity from a browser application that is associated with a browser application identification, and at block 102 the $3^{rd}$ party device 210 may send that browser application identification as the user identifier 212 to the system provider device 208. In another example, the $3^{rd}$ party may have collected mobile application activity from a mobile application on a mobile user device that is associated with a mobile user device identification, and at block 102 the $3^{rd}$ party device 210 may send that mobile user device identification as the user identifier 212 to the system provider device 206. In another example, the $3^{rd}$ party may have collected an email address for the provision of a newsletter to a user, and at block 102 the $3^{rd}$ party device 210 may send that email address as the user identifier 212 to the system provider device 206.

While a few examples have been provided, one of skill in the art in possession of the present disclosure would recognize that a variety of other user identifiers that are not associated with a user account in the database 208 may be received in a variety of different manners by the system provider device 206 while remaining within the scope of the present disclosure. In such embodiments, at block 102, the system provider device 206 may create a user account 214 as an unknown user account and associate the user identifier 212 with that user account, as illustrated in FIG. 2a.

In some embodiments, the user identifier 212 created at block 102 may be for a user that is known to the system provider device 206 (e.g., a user identifier 212 that is created for a user account stored in the database 208.) First user identifiers from known users may be created by the system provider device 206 following communications with the user device 202. For example, a user may use the user device 202 to create an account with the system provider device 206 or with an entity monitored by the system provider device 206. In such embodiments, the user may use the user device 202 to provide a variety of user information to create the user account such as, for example, a user email address, a user home address, a user business address, a user phone number, a user financial account number, a user gender, a user social media account address, and/or a variety other information known in the art that is provided by users in setting up accounts. In response, the system provider device 206 may create the user account 214 as a known user account, create a user account identifier (e.g., an account number) as the user identifier 212, and associate the user identifier 212 with that user account 214 in the database 208. In addition to the user account identifier 212, the system provider 208 may associated any or all of the information provided by the user in creating the user account with the user identifier 212 in the database 208.

FIG. 3a illustrates a specific embodiment of block 102 of the method where the first user identifier is created for a known user and stored in the database. In that embodiment, the user uses the user device 302 to connect to the payment service provider device 306 over the network 304 to create a user payment account. As is known in the art, a payment service provider may provide a user payment account to a user by linking one or more financial accounts of the user to the user payment account, and/or providing a financial account to the user that is linked with the user payment account, and the user may use the user payment account to make purchases from merchants. At block 102, the user may use the user device 302 to send user information to the payment service provider device 306, which typically includes a user email address and/or phone number and a user financial account identifier (e.g., a bank account number, a credit card number, etc.) for use by the payment service provider in funding purchases made by the user. At block 102, the payment service provider device 306 will create a user payment account 312 with an associated user payment account identifier 314, and will associate the user payment account identifier 314 with the user payment account 312 in the database 308. In addition, the payment service provider device 306 may associate the user email address and/or phone number with the user account identifier 314 (e.g., the user email address and/or phone number may be associated as separate identifiers with the user account identifier 314, discussed below, or become part of the user account identifier 314) in the database 308.

While the embodiments of block 102 of the method 100 focus on the creation of the first user identifier following network communications with the user device 202, in some embodiments, the creation of the user account 214 and the user identifier 212 and their association in the database 208 occur as a result of a face-to-face transaction. For example, a user may create the user account 214 by interacting face-to-face with a banking account provider (to open a banking account), a merchant (to obtain a merchant-specific credit card), and/or a variety of other account-providing entities known in the art. Thus, any account provision by a system provider, or monitored by the system provider, may result in a user account being created for a known user and associated with a user identifier.

The method 100 then proceeds to block 104 where first user data that is associated with the first user identifier is received and stored in the database. In the embodiments discussed above with regard to FIG. 2a in which the user identifier 212 for an unknown user is received by the system provider device 206 during communications with the 3$^{rd}$ party device 210, that user identifier 212 may have been received along with the first user data 216, and at block 104 the system provider device 206 may associate that first user data 216 with the user account 214 in the database 208, as illustrated in FIG. 2b.

For example, the user identifier 212 may be a browser application identification for a browser application that was provided to the system provider device 208 by the 3$^{rd}$ party device 210 along with user browser activity data (i.e., the first user data 216), and at block 104 the system provider device 208 may associate that that user browser activity data with the user account 214 in the database 208. In another example, the user identifier 212 may be a mobile device identification for a mobile user device that was provided to the system provider device 208 by the 3$^{rd}$ party device 210 along with mobile user device activity data (i.e., the first user data 216), and at block 104 the system provider device 208 may associate that that mobile user device activity data with the user account 214 in the database 208. In another example, the user identifier 212 may be an email address for the provision of a newsletter to a user that was provided to the system provider device 208 by the 3$^{rd}$ party device 210 along with user preference/newsletter activity data (i.e., the first user data 216), and at block 104 the system provider device 208 may associate that that user preference/newsletter activity data with the user account 214 in the database 208.

In the embodiments discussed above with regard to FIG. 2a in which the first user identifier from an unknown user is created by the system provider device 206 following communications with the user device 202, first user data 216 associated with that user identifier 212 may be subsequently received by the system provider device 206, and at block 104 the system provider device 206 may associate that first user data 216 with the user account 214 as illustrated in FIG. 2b.

For example, the user identifier 212 may be a browser application identification retrieved from a browser application on the user device 202 at block 102, and at block 104 the system provider device 208 may receive user browser application activity data (i.e., the first user data 216) that is associated with that browser application identification and, in response, associate that user browser application activity data with the user account 214 in the database 208. In another example, the user identifier 212 may be a mobile device identification retrieved from a mobile user device 202 at block 102, and at block 104 the system provider device 208 may receive mobile user device activity data (i.e., the first user data 216) that is associated with that mobile device identification and, in response, associate that mobile user device activity data with the user account 214 in the database 208. In another example, the user identifier 212 may be an email address provided by the a user (e.g., to sign up for a newsletter) at block 102, and at block 104 the system provider device 208 may receive user activity data (i.e., the first user data 216) that is associated with that email address and, in response, associate that user activity data with the user account 214 in the database 208.

In the embodiments discussed above with regard to FIG. 2a in which the user identifier 212 is created for a user that is known to the system provider device 206, that user identifier 212 may be subsequently received along with the first user data 216, and at block 104 the system provider device 206 may associate that first user data 216 with the user account 214 as illustrated in FIG. 2b. For example, the user identifier 212 may be a user account identifier associated with the user account 214 created at block 102, and at block 104 the system provider device 208 may receive user account activity data (i.e., the first user data 216) that is associated with that user account identifier and, in response, associate that user account activity data with the user account 214 in the database 208.

Figure 3B:
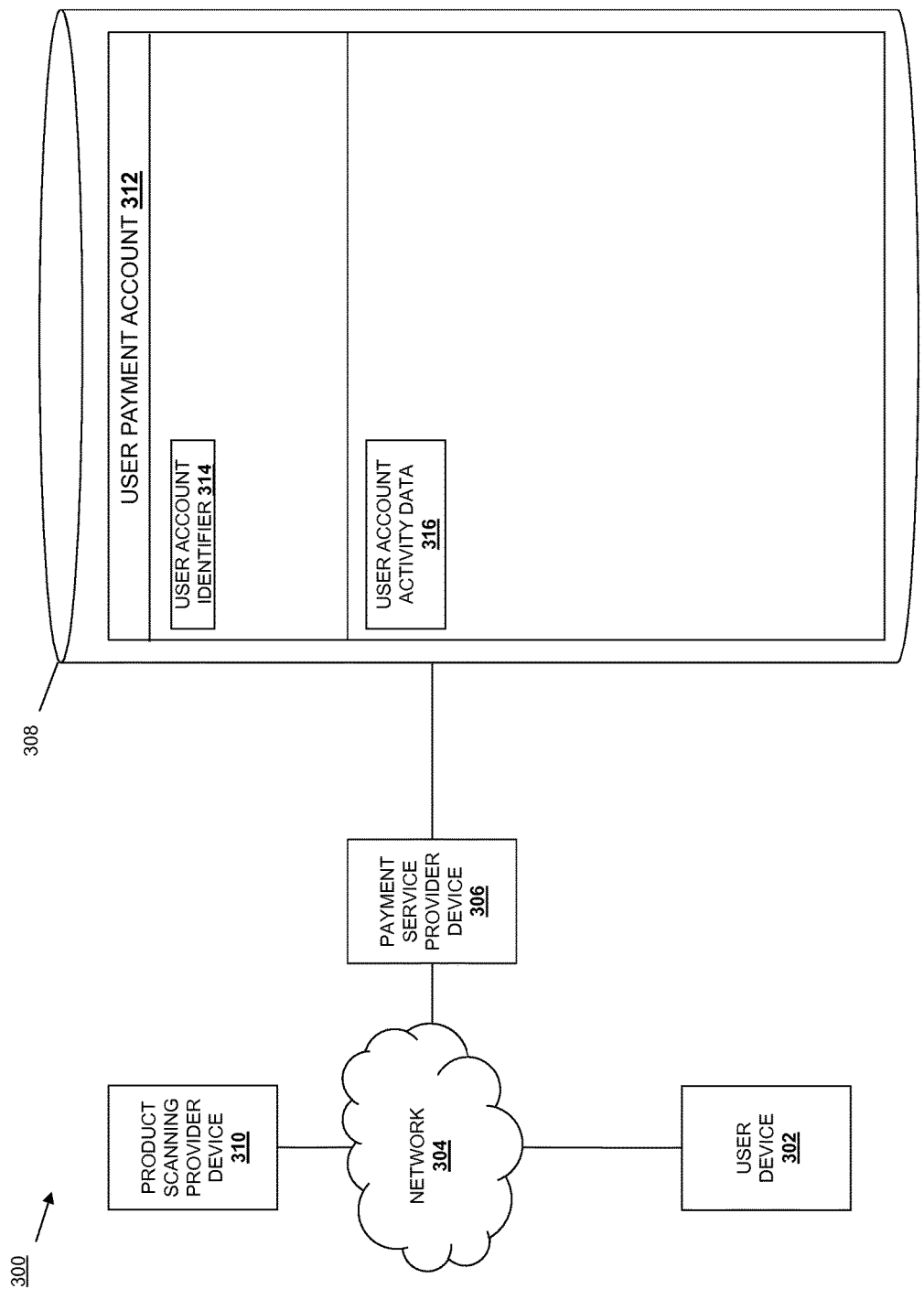
FIG. 3b is a schematic view illustrating an embodiment of the user profiling system of FIG. 3a including user payment account activity data associated with the user payment account in the database.
Figure 3C:
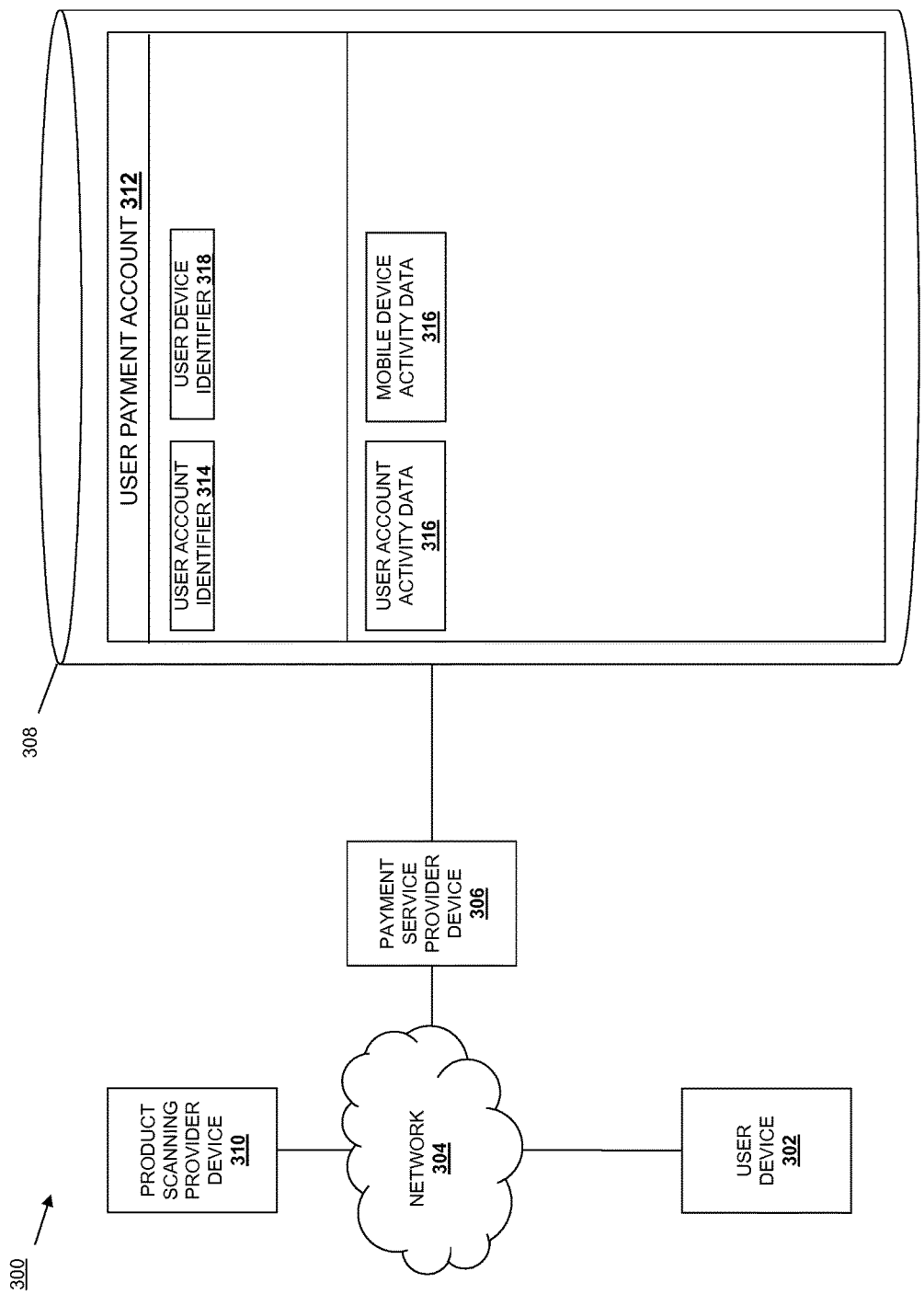
FIG. 3c is a schematic view illustrating an embodiment of the user profiling system of FIG. 3b including a user device identifier and user mobile device activity data associated with the user payment account in the database.

FIG. 3b illustrates a specific embodiment of block 104 of the method where the user account activity data is received and stored in the database. In that embodiment, subsequent to the creation of the user payment account 312 in block 102, the user uses that user payment account to make purchases from merchants. At block 104, user payment account activity data 316 (e.g., purchase information, merchant information, etc.) that is associated with the user payment account identifier 314 is then received by the payment service provider device 306 and associated with the user payment account 312 in the database 308.

In the embodiments discussed above with regard to unknown users, following block 104, the database 208 includes an unknown user account 214 with a user identifier 212 (e.g., a browser application identification, a mobile device identification, an email address, etc.) and first user data 216 (e.g., user browser application data, user mobile device data, user preferences for a newsletter, etc.) for a user that either does not have a user account with the system provider, or that has a user account with the system provider but there is no link or association between the user identifier 212 and that user account. In such embodiments, the method 100 may proceed as described below for method blocks 106-110 to associate other user identifiers and user data with the unknown user account 214 such that the unknown user account 214 compiles a plurality of conventionally discrete data sets about the unknown user. However, as some point that unknown user may create a user account with the system provider as discussed above. The user information provided to create that user account will include a user identifier (e.g., a phone number, an email address, a financial account number, a mobile device identification, etc.) that links that unknown user to the previously collected user identifiers and user data in the unknown user account. As such, the unknown user will transition to a known user, and that unknown user account to a known user account.

For example, a plurality of user browser application activity data may be associated with a browser application identification in an unknown user account. A user may then create a user account with the system provider, and in the course of creating that user account, that user's browser application identification may be retrieved. In response to match of browser application identifications (associated with the unknown user account and provided during the creation of the user account), the user account identifier and the browser application identification may be associated with the user account, and the user browser application activity data may be associated with the user account and any purchase activity data. Furthermore, multiple user identifiers and sets of user data may be associated with an unknown user account prior to a user creating an account with the system provider, and the creation of that account with the system provider may result in the association of all the multiple users' identifiers and user data. Further still, even if a user never creates a user account with the system provider, the system provider may compile associated user identifiers and user data for that unknown user for use in profiling that unknown user.

Figure 2C:
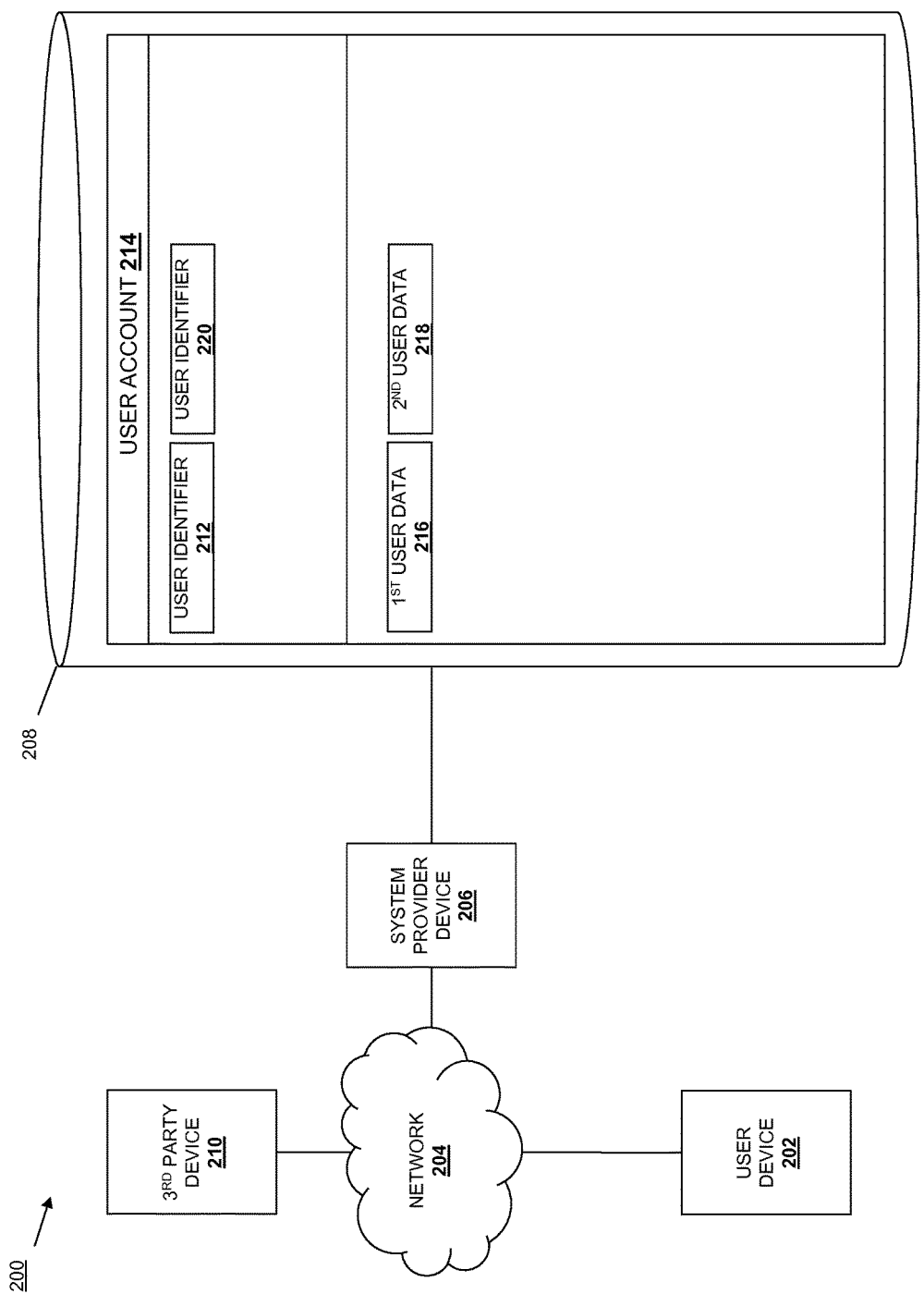
FIG. 2c is a schematic view illustrating an embodiment of the user profiling system of FIG. 2b including a second user identifier and second user data associated with the user account in the database.

Referring now to FIGS. 1 and 2c, the method 100 then proceeds to blocks 106, 108, and 110 where second user data that is associated with a second user identifier and the first user identifier is received, the second user identifier is associated with the first user identifier in the database, and the second user data is associated with the first user data in the database. As discussed with regard to the second user data and the third user data below, once an user identifier has been received, created, or discovered for a user, other user identifiers may be received along with the previously received, created, or discovered user identifier. Those other user identifiers may then be associated with the previously received, created, or discovered user identifier, and the user data received along with those other users identifiers may then be associated with the user account in the database. In this manner, conventionally discrete sets of user data are compiled and associated with a single user (e.g., via their user account).

At block 106, the system provider device 206 may receive second user data 218 that is associated with a user identifier 220 as well as the user identifier 212 that was stored in the database 208 in association with the user account 214 at block 102. In an embodiment, at block 102 of the method 100, the user may have created the user account 214 such that the user account identifier 212 was associated with the user account 214 in the database. At block 106, the user may perform a user account activity (e.g., a purchase) using the user account 214 that includes the user identifier 220 along with the user identifier 212.

For example, the user may make a purchase using the user account 214 via a browser application. In response, at block 106, the system provider device 206 will receive the user account identifier (user identifier 212), the browser application identification (user identifier 220), and user data associated with user browser application activity. At block 108, the system provider device 206 will then associate the user account identifier with the browser application identification in the user account 214, and at block 110, the system provider device 206 will associate the user data associated with the user browser application activity (the second user data 218) with the first user data 216 in the user account 214.

In another example, the user may use the user account 214 to make a payment for tickets to an event ticket provider. In response, at block 106, the system provider device 206 will receive the user account identifier (user identifier 212), a ticket provider account identifier (user identifier 220), and user data associated with users activities in purchasing tickets from the event ticket provider. At block 108, the system provider device 206 will then associate the user account identifier with the ticket provider account identifier in the user account 214, and at block 110, the system provider device 206 will associate the user data associated with users activities in purchasing tickets from the event ticket provider (the second user data 218) with the first user data 216 in the user account 214.

In another example, the user may have used an email address or phone number to sign up for a $3^{rd}$ party service offered through the $3^{rd}$ party device. At block 106, the $3^{rd}$ party device may share the email address or phone number (the user identifier 212) with the system provider device 206, as well as a $3^{rd}$ party service user identifier (the user identifier 220), and user data associated with the users activities associated with the $3^{rd}$ party service. At block 108, the system provider device 206 will then associate the user account identifier (that includes the associated email address or phone number) with the $3^{rd}$ party service user identifier in the user account 214, and at block 110, the system provider device 206 will associate the user data associated with the users activities associated with the $3^{rd}$ party service (the second user data 218) with the first user data 216 in the user account 214.

In an embodiments such as those described above that include the exchange of sensitive user information between the system provider device 206 and the $3^{rd}$ party device such as, for example, the email address and/or phone number discussed above, the system may operate to conceal such user information while still allowing that user information to be used as user identifiers. For example, sensitive user information such as email addresses and phone numbers may be hashed before providing them as hashed email addresses and hashed phone numbers to another party. Thus, when a $3^{rd}$ party device sends any user identifiers associated with sensitive user information, that $3^{rd}$ information may first perform a hashing operation on those user identifiers to produce hashed user identifiers, and those hashed user identifiers may then be sent to the system provider device. The system provider device may then perform that hashing operation of the user identifiers stored in their database to produce corresponding hashed user identifiers, and perform a check to determine whether any of their hashed user identifiers match the hashed user identifiers received from the $3^{rd}$ party device. If so, the user data associated with the hashed user identifiers received from the $3^{rd}$ party device may be associated with the user account provided by the system provider that includes the matching hashed user identifiers. In this manner, user data may be shared between parties without the sharing of sensitive user information.

In an embodiment, at blocks 106, 108, and 110 of the method, different sets of user browser activity may be linked. For example, a first "cookie" may be provided on a user browser application that causes the user browser activity to be recorded as first user data and associated with the user account 214 in the database 208. The user may then delete that first cookie. Subsequently, a second cookie may be provided on the user browser application that causes the user browser activity to be recorded as second user data. If the user then uses the browser application in association with the user account 214 (e.g., to make a payment, sign on to the user account, etc.), that second user data that includes the user browser activity recorded by the second cookie may then be associated with the first user data that includes the user browser activity recorded by the first cookie. In this manner, new cookie activity that occurs after a previous cookie was deleted may be associated with the old cookie activity recorded by that previous cookie.

Referring back to the specific embodiment illustrated in FIGS. 3a-3d, subsequent to creating the user payment account 312, the user may add a mobile payment application that is provided by the payment service provider to the user device 302. In response, the user device 302 may send the payment system provider device 306 a mobile device identifier 318 that is associated with the mobile device 302, and at block 108 the payment service provider device 306 may associate that mobile device identifier 318 with the user payment account identifier 314 in the user payment account 312 in the database 308. Then, at block 110, the user device 302 may send the payment service provider device 306 mobile device activity data 320, which the payment service provider device 306 may then associate with the user payment account activity data 316 in the user payment account 312 in the database 308. In an embodiment, mobile device activity data 320 may include mobile device locations, activities performed using the mobile device, and/or a variety of other mobile device user activity known in the art.

Figure 2D:
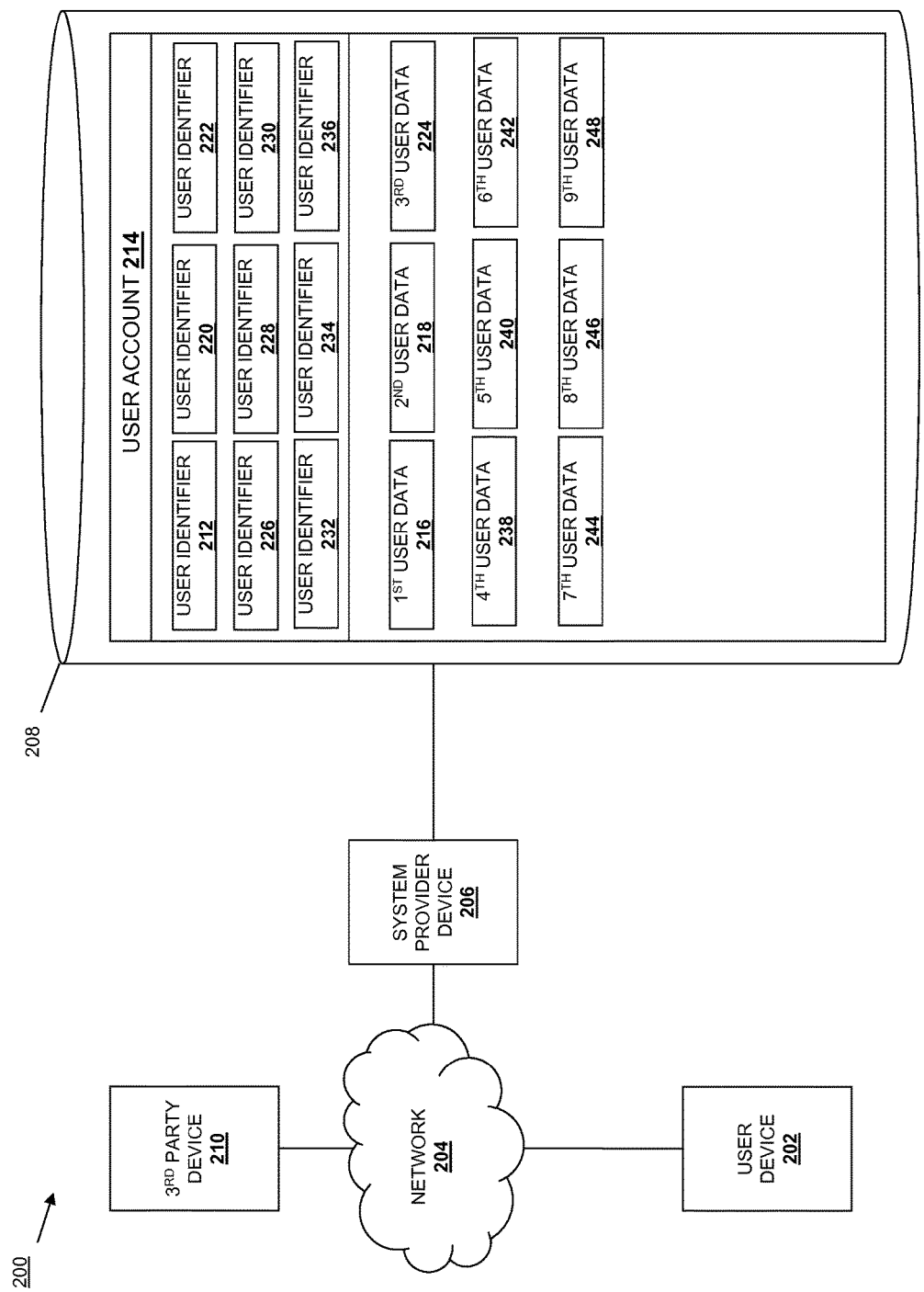
FIG. 2d is a schematic view illustrating an embodiment of the user profiling system of FIG. 2c including a plurality of user identifiers and discrete sets of user data associated with the user account in the database.

Referring now to FIGS. 1 and 2d, the method 100 then proceeds to blocks 112, 114, and 116 where third user data that is associated with a third user identifier and at least one of the first user identifier and the second user identifier is received, the third user identifier is associated with the first user identifier and the second user identifier in the database, and the third user data is associated with the first user data and the second user data in the database.

At block 110, the system provider device 206 may receive third user data 224 that is associated with a user identifier 222 along with at least one of the user identifier 212 and the user identifier 220 that were stored in the database 208 in association with the user account 214 at blocks 102 and 108. In an embodiment, at block 110, the user may perform a user account activity (e.g., a purchase) using the user account 214 that includes the user identifier 222 and the user identifier 212. In another embodiment, at block 110, the user may perform a user account activity associated with and including the user identifier 222 and the user identifier 220.

For example, the user may make a purchase using the user account 214 via a mobile user device 202. In response, at block 110, the system provider device 206 will receive the user account identifier (user identifier 212), the mobile device identification (user identifier 222), and mobile user device activity associated with mobile user device 202. At block 112, the system provider device 206 will then associate the mobile device identification with the other user identifiers 212 and 220 in the user account 214, and at block 110, the system provider device 206 will associate the user data associated with the mobile user device activity (the third user data 224) with the first user data 216 and the second user data 218 in the user account 214.

In another example, the user may use the user account 214 to make a bid on a product that is being auctioned. In response, at block 110, the system provider device 206 will receive the user account identifier (user identifier 212), an auction account identifier (user identifier 222), and user data associated with users activities in bidding on that auction or a plurality of previous auctions. At block 112, the system provider device 206 will then associate the auction account identifier with the other user identifiers 212 and 220 in the user account 214, and at block 110, the system provider device 206 will associate the user data associated with users activities in bidding on that auction or a plurality of previous auctions (the third user data 224) with the first user data 216 and the second user data 218 in the user account 214.

In another example, the user may have used an email address or phone number to register for a contest held by a contest provider. At block 110, the contest provider may share the email address or phone number (the user identifier 212) with the system provider device, as well as a contest provider user identifier (the user identifier 220), and user data associated with the users activities with the contest provider. At block 110, the system provider device 206 will then associate the contest provider user identifier with the other user identifiers 212 and 220 in the user account 214, and at block 110, the system provider device 206 will associate the user data associated with the users activities with the contest provider (the second user data 218) with the first user data 216 and the second user data 218 in the user account 214.

As illustrated in FIG. 2d, any number of additional sets of user data and user identifiers may be associated with the user account 214 by looping through blocks 110-114 of the method 100. In the illustrated embodiment, user identifier 226 and associated $4^{th}$ user data 238, user identifier 228 and associated $5^{th}$ user data 240, user identifier 230 and associated $6^{th}$ user data 242, user identifier 232 and associated $7^{th}$ user data 244, user identifier 234 and associated $8^{th}$ user data 246, and user identifier 236 and associated $9^{th}$ user data 248, have been associated with the user identifiers 212, 220, and 222, and the 1st user data 216, $2^{nd}$ user data 218, and $3^{rd}$ user data 224.

Referring back to the specific embodiment illustrated in FIGS. 3a-3d, subsequent to creating the user payment account 312, the user may download a product scanning application from a product scanning provider device 310 to the user device 302, and setup a product scanning user account with the product scanning provider device 310 that includes the provision of an email address of the user. At block 112, the product scanning provider device 310 may perform a hashing operation of email address and send that hashed email address to the payment service provider device 306. In response to receiving the hashed email address, the payment service provider device 306 may perform the hashing operation on user identifiers in the database 308 and determine if any of the results match the hashed email address received from the product scanning provider device 310. If so, at block 110, the product scanning provider device 310 may send the payment service provider device 306 a plurality of product scanning activity data 322 and the associated product scanning user account identifier 324. The payment service provider device 306 may then associate the product scanning activity data 322 with the user payment account activity data 316 and the mobile device activity data 320 in the user payment account 312 in the database 308, and associate the product scanning user identifier 324 with the user account identifier 314 and user device identifier 318 in the database 308 as well.

Figure 3D:
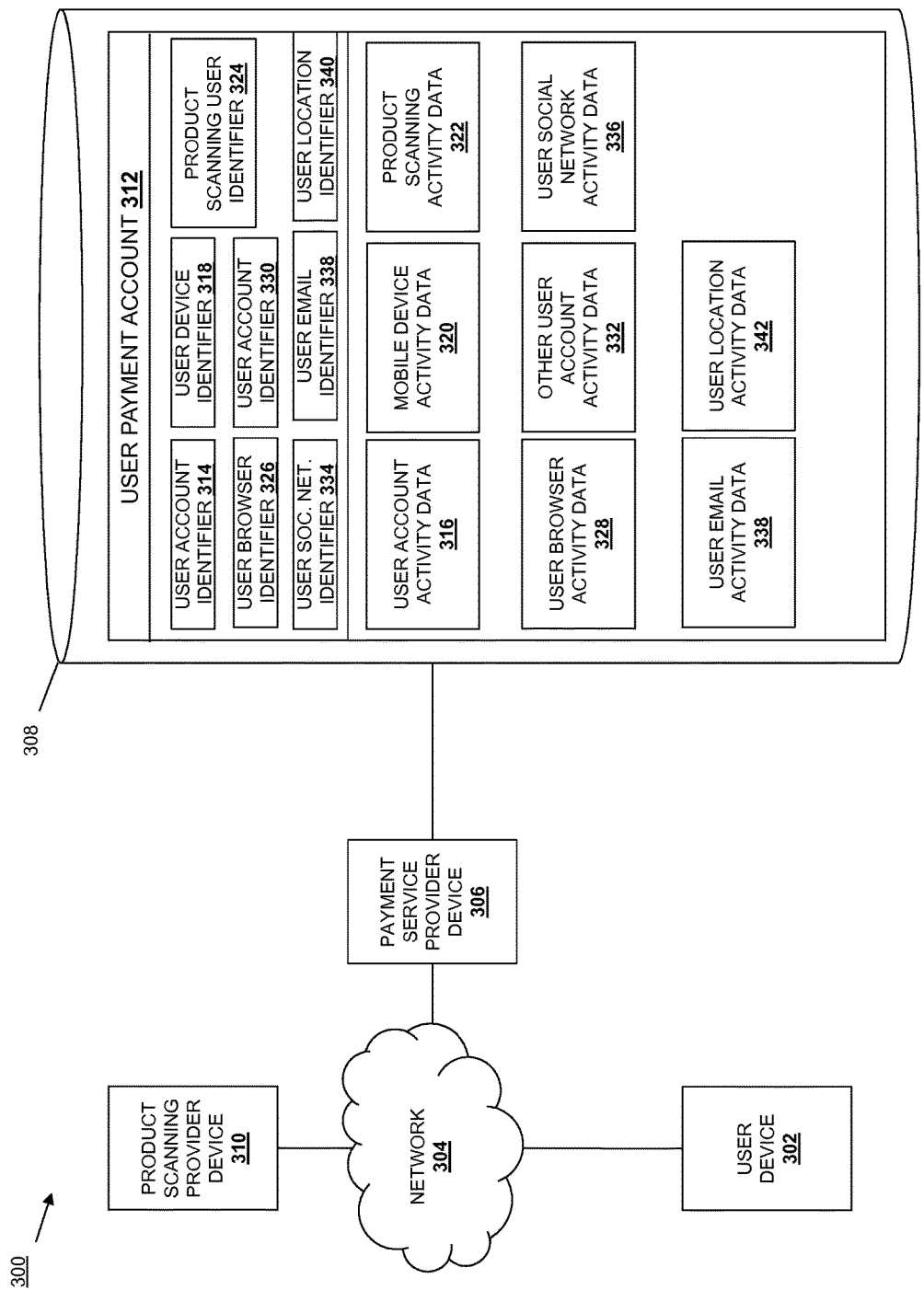
FIG. 3d is a schematic view illustrating an embodiment of the user profiling system of FIG. 3c including a plurality of user identifiers and discrete sets of user data associated with the user payment account in the database.

As illustrated in FIG. 3d, any number of additional sets of user data and user identifiers may be associated with the user account 312 by looping through blocks 110-114 of the method 100. In the illustrated embodiment, user browser identifier 326 and associated user browser activity data 328, other user account identifier 330 and associated other user account activity data 332, user social network identifier 334 and associated user social network activity data 336, user email identifier 338 and associated user email activity data 338, and user location identifier 340 and associated user location activity data 342 have been associated with the user identifiers 314, 318, and 324, and the user account activity data 316, user mobile device activity data 320, and product scanning activity data 333.

The method 100 then proceeds to block 118 where a user profile is created using the first user data, second user data, third user data, and/or any other user data associated with the user account. In an embodiment, the system provider device 206 may use the user data collected and associated with the user account to create a profile for the user associated with that user account. For examples, based on shopping and purchase history associated with user payment activities, income level as determined from financial account activities, marital status as retrieved from a social network activities, stores frequented as determined from location activities, products viewed as determined from browser application activities, and/or using any other user data associated with the user account, the user may be profiled such that they may be more effectively targeted for ads and offers.

In specific embodiments of block 118, brand preference and/or loyalty can be inferred by product scan & purchase data. For example, if a user always scans a particular product manufacturers products (e.g., Nike® shoes), browses those products on websites, buys at a product manufacturer store (e.g., a Nike® store) using their payment service provider account, etc., psychographic characteristics can be inferred by such scanning, purchase or browsing data. If a user scans organic products, donates to wildlife charities with their payment service provider account, and/or browses hybrid & electric cars on websites, they could be categorized, for example, as "environmentally sensitive". Additionally, if the user is determined to have made purchases at merchants in Boston, Mass. (either based on mobile device GPS and/or merchant addresses known from a merchant onboarding process with the payment service provider) for a period of 6 months, but then stops transacting in Boston, Mass. and begins transacting at merchants in San Francisco, Calif. consistently for a period of 1 month, they could be categorized, for example, as a "recently relocated user". In addition, trends across the network of users may be leveraged for predictive segments. For example, if a statistically relevant group of users are female and between 45-55 years old, regularly scan travel books and browse sporting equipment, and are then determined to make a large purchase with an airline within two weeks, the system may then categorized all users who are female and between 45-55 years old and who regularly scan travel books and browse sporting equipment as users that are in the market for airline tickets in the next two weeks.

Furthermore, queries of the user data in user accounts may be made using any of the user identifiers. For example, a query may be provided to the system provider device 206 that includes one of the user identifiers 212, 220, 222, 226, 228, 230, 232, 234, or 236 and, in response, the system provider device 206 will search each of the first user data, 216, the second user data 218, the third user data 224, the fourth user data 238, the fifth user data 240, the sixth user data 242, the seventh user data 244, the eight user data 246, and the ninth user data 248 according to the query to return a result.

In specific embodiments, the database can be queried to return a variety of results. For example, based on a single identifier provided for a user in a query, the system may return results that include all the other identifiers for that user, which facilitates identity syncing with other systems based on the identity record in the system. In another example, based on an identifier provided for a profile segment in a query, the system may return results that include all the user identifiers that are qualified for that segment. In another example, based on a single identifier provided for a user in a query, the system may return results that include all the profile segments for which that user is qualified. In another example, based on a single identifier provided for a user in a query along with an advertising campaign identifier, the system may return results that include how many times that user has seen advertisements associated with that campaign, which facilitates the tracking of advertising exposure frequency for a user, regardless of which channels (web, mobile, email) the message was delivered (as opposed to conventional systems that can only track a user within a single channel.) While a few specific examples of queries have been provided, one of skill in the art in possession of the present disclosure will recognize that a variety of other queries may return meaningful results given the data collected and associated in the system of the present disclosure.

In the specific example illustrated in FIGS. 3a-3d, a user profile may be created using user product scanning activities associated with the product scanning application provided by the product scanning provider. Information about items scanned and locations of the user, along with any of the other user data collected, may be used to create a particular user profile, along with a group or groups with which the user is associated. In an embodiment, a group or groups may share common or important profile traits. For example, from a group of users that use the product scanning application, a larger group of users that do not use the product scanning application may be identified that share characteristics with the product scanning application users, and that larger groups may then be specifically marketed to based on the group characteristics or profile(s). Furthermore, the payment service provider device 306 may be provided a query that includes the user device identifier 318, and the system provider device will search each of the user account activity data 316, the mobile device activity data 320, the product scanning activity data 322, the user browser activity data 328, the other user account activity data 332, the user social network activity data 336, the user email activity data 338, and the user location activity data 342 according to the query to return a result.

Thus, a system and method for profiling a user has been described that aggregates a plurality of user data from discrete user activities via the association of discrete user identifiers. New user identifiers are added to the user account when associations between the new user identifiers and existing user identifiers are recognized, allowing new user data to be associated with the user account. This linking of user identifiers results in the aggregation of many different sources of user data, which may then be analyzed to determine profiles of the user or groups of users. Those profiles may then be used to market to users based on specific characteristics associated with those profiles and users.

Figure 4:
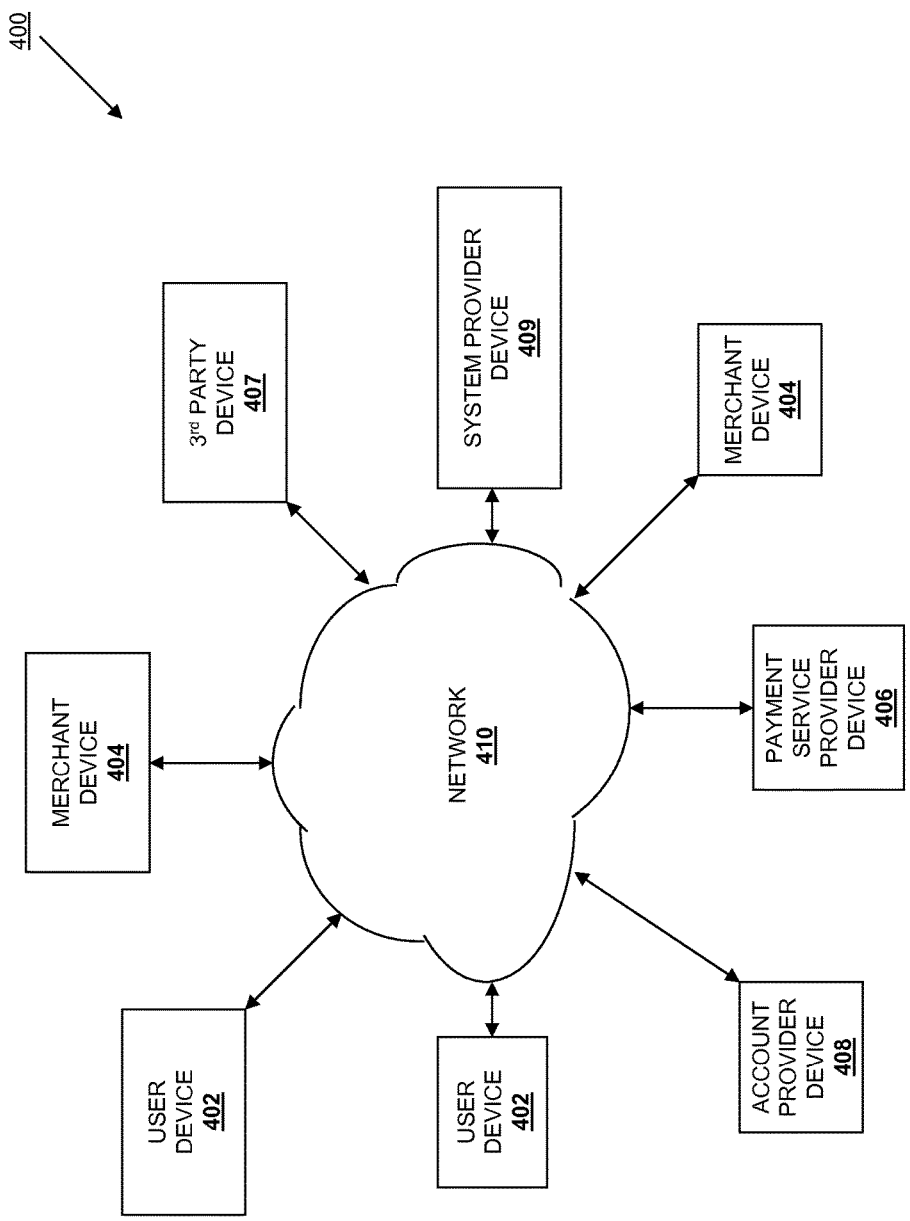
FIG. 4 is a schematic view illustrating an embodiment of a networked system.

Referring now to FIG. 4, an embodiment of a network-based system 400 for implementing one or more processes described herein is illustrated. As shown, network-based system 400 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX®

OS, or other suitable server-based OS. It can be appreciated that the servers illustrated in FIG. 4 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 400 illustrated in FIG. 4 includes a plurality of user devices 402, a plurality of merchant devices 404, a payment service provider device 406, a $3^{rd}$ party device 407, an account holder devices 408, and/or a system provider device 409 in communication over a network 410. Any of the user devices 402 may be the user devices 202 or 302, discussed above. In some embodiments, the user device 402 may include a user web browser located on a user computer. The merchant device 404 may be the merchant device or devices discussed above and may be operated by the merchants discussed above. In some embodiments, the merchant device 404 may include a merchant account or an identifier that is associated with a merchant account. The payment service provider device 406 may be the payment service provider device 306 discussed above and may be operated by a payment service provider such as, for example, PayPal Inc. of San Jose, Calif. The $3^{rd}$ party device 407 may be the third party devices 210 or 310 discussed above and may be operated by the $3^{rd}$ parties discussed above. The account provider devices 408 may be the account provider devices discussed above and may be operated by the account providers discussed above such as, for example, credit card account providers, bank account providers, savings account providers, and a variety of other account providers known in the art. The system provider device 409 may be the system provider devices 206 discussed above and may be operated by the system providers discussed above.

The user devices 402, merchant device 404, payment service provider device 406, $3^{rd}$ party device 407, account provider device 408, and system provider device 409 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 400, and/or accessible over the network 410.

The network 410 may be implemented as a single network or a combination of multiple networks. For example, in various embodiments, the network 410 may include the Internet and/or one or more intranets, landline networks, wireless networks, and/or other appropriate types of networks.

The user device 402 may be implemented using any appropriate combination of hardware and/or software configured for wired and/or wireless communication over network 410. For example, in one embodiment, the user device 402 may be implemented as a personal computer of a user in communication with the Internet. In other embodiments, the user device 402 may be a smart phone, personal digital assistant (PDA), laptop computer, and/or other types of computing devices.

The user device 402 may include one or more browser applications which may be used, for example, to provide a convenient interface to permit the user to browse information available over the network 410. For example, in one embodiment, the browser application may be implemented as a web browser configured to view information available over the Internet.

The user device 402 may also include one or more toolbar applications which may be used, for example, to provide user-side processing for performing desired tasks in response to operations selected by the user. In one embodiment, the toolbar application may display a user interface in connection with the browser application.

The user device 402 may further include other applications as may be desired in particular embodiments to provide desired features to the user device 402. In particular, the other applications may include a payment application for payments assisted by a payment service provider through the payment service provider device 406. The other applications may also include security applications for implementing user-side security features, programmatic user applications for interfacing with appropriate application programming interfaces (APIs) over the network 410, or other types of applications. Email and/or text applications may also be included, which allow the user to send and receive emails and/or text messages through the network 410. The user device 402 includes one or more user and/or device identifiers which may be implemented, for example, as operating system registry entries, cookies associated with the browser application, identifiers associated with hardware of the user device 402, or other appropriate identifiers, such as a phone number. In one embodiment, the user identifier may be used by the payment service provider device 406, account provider device 408, and/or system provider device 409 to associate the user with a particular account as further described herein.

The merchant device 404 may be maintained, for example, by a conventional or on-line merchant, conventional or digital goods seller, individual seller, and/or application developer offering various products and/or services in exchange for payment to be received conventionally or over the network 410. In this regard, the merchant device 404 may include a database identifying available products and/or services (e.g., collectively referred to as items) which may be made available for viewing and purchase by the user.

The merchant device 404 also includes a checkout application which may be configured to facilitate the purchase by the payer of items. The checkout application may be configured to accept payment information from the user through the user device 402, the account provider through the account provider device 408, and/or from the payment service provider through the payment service provider device 406 over the network 410.

Figure 5:
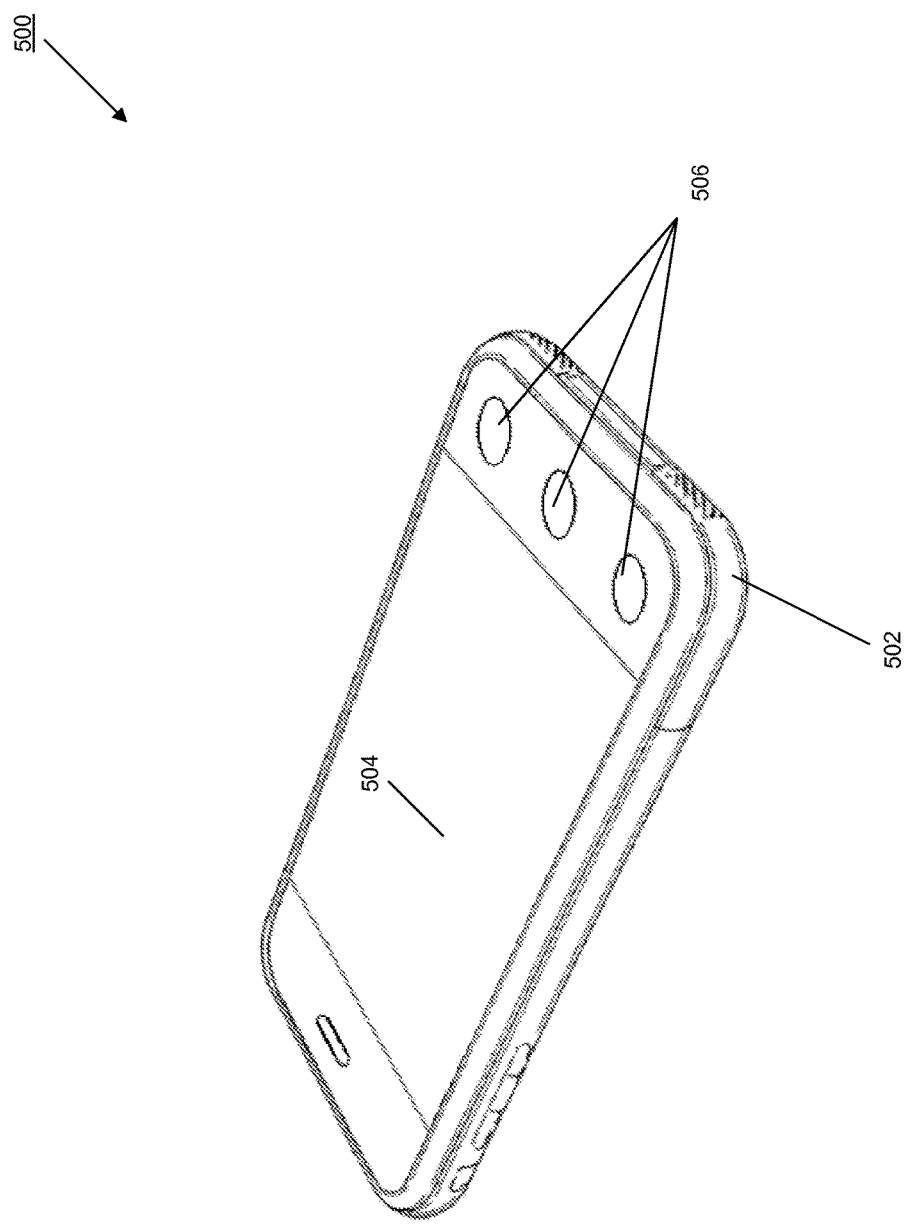
FIG. 5 is a perspective view illustrating an embodiment of a user device.

Referring now to FIG. 5, an embodiment of a user device 500 is illustrated. The user device 500 may be the user devices 202, 302, and/or 402. The user device 500 includes a chassis 502 having a display 504 and an input device including the display 504 and a plurality of input buttons 506. One of skill in the art will recognize that the user device 500 is a portable or mobile phone including a touch screen input device and a plurality of input buttons that allow the functionality discussed above with reference to the method 100. However, a variety of other portable/mobile payer devices and/or desktop payer devices may be used in the method 100 without departing from the scope of the present disclosure.

Figure 6:
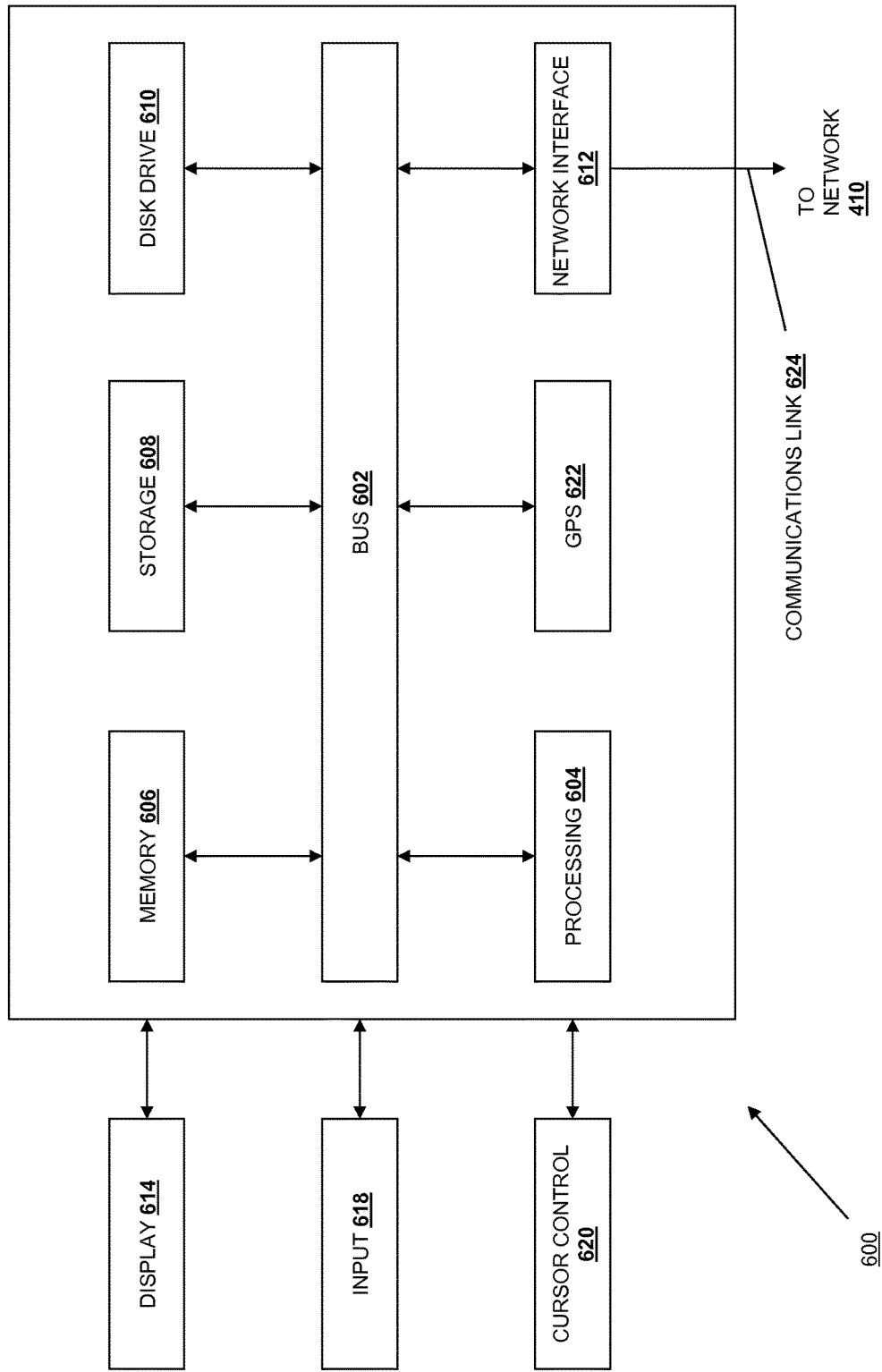
FIG. 6 is a schematic view illustrating an embodiment of a computer system.

Referring now to FIG. 6, an embodiment of a computer system 600 suitable for implementing, for example, the user devices 202, 302, 402, or 500, the merchant device 404, the payment service provider devices 306 or 406, the $3^{rd}$ party device 210, 310, or 407, the account provider device 408, and/or the system provider devices 206 or 409, is illustrated. It should be appreciated that other devices utilized by users, merchants, payment service providers, 3$^{rd}$ parties, account providers, or system providers in the user profiling system discussed above may be implemented as the computer system 600 in a manner as follows.

In accordance with various embodiments of the present disclosure, computer system 600, such as a computer and/or a network server, includes a bus 602 or other communication mechanism for communicating information, which interconnects subsystems and components, such as a processing component 604 (e.g., processor, micro-controller, digital signal processor (DSP), etc.), a system memory component 606 (e.g., RAM), a static storage component 608 (e.g., ROM), a disk drive component 610 (e.g., magnetic or optical), a network interface component 612 (e.g., modem or Ethernet card), a display component 614 (e.g., CRT or LCD), an input component 618 (e.g., keyboard, keypad, or virtual keyboard), a cursor control component 620 (e.g., mouse, pointer, or trackball), and/or a location determination component 622 (e.g., a Global Positioning System (GPS) device as illustrated, a cell tower triangulation device, and/or a variety of other location determination devices known in the art.) In one implementation, the disk drive component 610 may comprise a database having one or more disk drive components.

In accordance with embodiments of the present disclosure, the computer system 600 performs specific operations by the processor 604 executing one or more sequences of instructions contained in the memory component 606, such as described herein with respect to the user device 202, 302, 402, and 500, the merchant device(s) 404, the payment service provider device 306 or 406, the 3$^{rd}$ party device 210, 310, and 407, the account provider device(s) 408, and/or the system provider devices 206 and 409. Such instructions may be read into the system memory component 606 from another computer readable medium, such as the static storage component 608 or the disk drive component 610. In other embodiments, hard-wired circuitry may be used in place of or in combination with software instructions to implement the present disclosure.

Logic may be encoded in a computer readable medium, which may refer to any medium that participates in providing instructions to the processor 604 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 610, volatile media includes dynamic memory, such as the system memory component 606, and transmission media includes coaxial cables, copper wire, and fiber optics, including wires that comprise the bus 602. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 600. In various other embodiments of the present disclosure, a plurality of the computer systems 600 coupled by a communication link 624 to the network 410 (e.g., such as a LAN, WLAN, PTSN, and/or various other wired or wireless networks, including telecommunications, mobile, and cellular phone networks) may perform instruction sequences to practice the present disclosure in coordination with one another.

The computer system 600 may transmit and receive messages, data, information and instructions, including one or more programs (i.e., application code) through the communication link 624 and the network interface component 612. The network interface component 612 may include an antenna, either separate or integrated, to enable transmission and reception via the communication link 624. Received program code may be executed by processor 604 as received and/or stored in disk drive component 610 or some other non-volatile storage component for execution.

Referring now to FIG. 7, an embodiment of a system provider device 700 is illustrated. In an embodiment, the device 700 may be the payment service provider devices 306 or 406, and/or the system provider devices 206 or 409. The device 700 includes a communication engine 702 that is coupled to the network 410 and to a user profiling engine 704 that is coupled to a user account database 706. The communication engine 702 may be software or instructions stored on a computer-readable medium that allows the device 700 to send and receive information over the network 410. The user profiling engine 704 may be software or instructions stored on a computer-readable medium that is operable to receive communicate with the user devices, provide user accounts, store user identifiers in association with the user account in the user account database 706, receive user data and user identifiers, create user profiles, perform hash operations on user identifiers, receive queries and search user data according to the queries to return a result, and provide any of the other functionality that is discussed above. While the database 706 has been illustrated as located in the system provider device 700, one of skill in the art will recognize that it may be connected to the user profiling engine 704 through the network 410 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on users and merchants; however, a user or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a user. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
    a non-transitory memory storing a first user identifier, wherein the first user identifier was created based on communications with a user through a network via a first user subsystem; and
    one or more hardware processors coupled to the non-transitory memory and configured to execute instructions to cause the system to perform operations comprising:
        receiving, through the network from the first user subsystem, first user subsystem activity data that is associated with the first user identifier and that was generated in response to a use of the first user subsystem by the user via a first user resource;
        determining that the user does not have a user account with an entity associated with the system based on the first user identifier not being associated with any user accounts maintained by the system;
        storing, in the non-transitory memory, the first user subsystem activity data as unknown user subsystem activity data with the first user identifier;
        receiving an account creation request from the user, wherein the request comprises at least the first user identifier;
        generating a first user account for the user based on the account creation request and the first user identifier;
        retrieving the first user subsystem activity data from the non-transitory memory based on the first user identifier;
        updating the first user account with the first user subsystem activity data;
        receiving, through the network from a second user subsystem that is different than the first user subsystem, second user subsystem activity data that is associated with the first user identifier and a second user identifier that is different from the first user identifier, wherein the second user subsystem activity data was generated in response to a use of the second user subsystem by the user via a second user resource that is different than the first user resource;
        storing, in the non-transitory memory in response to the second user subsystem activity data being associated with the first user identifier, the second user subsystem activity data and the second user identifier in association with the first user account;
        generating a user profile using the first user subsystem activity data and the second user subsystem activity data that are associated with the first user account;
        receiving, through the network from a third user subsystem that is different from the first user subsystem and the second user subsystem, third user subsystem activity data that is associated with the first user identifier and a third user identifier that is different from the first user identifier and the second user identifier, wherein the third user subsystem activity data was generated in response to a use of the third user subsystem by the user via a third user resource that is different than the first user resource and the second user resource;
        storing, in the non-transitory memory in response to the third user subsystem activity data being associated with the first user identifier, the third user subsystem activity data and the third user identifier in association with the first user account; and
        updating the user profile using the third user subsystem activity data associated with the first user account.

2. The system of claim 1, wherein the operations further comprise:
    receiving, through the network from a fourth user subsystem that is different from the first user subsystem, the second user subsystem, and the third user subsystem, and prior to storing the first user identifier in association with the first user account, fourth user subsystem activity data that is associated with a fourth user identifier;
    storing the fourth user subsystem activity data in the non-transitory memory;
    determining that the fourth user identifier matches one of the first user identifier, the second user identifier, or the third user identifier; and
    storing, in response to determining that the fourth user identifier matches one of the first user identifier, the second user identifier, or the third user identifier, the fourth user subsystem activity data and the fourth user identifier in association with the first user account in the non-transitory memory.

3. The system of claim 1, wherein the operations further comprise:
    receiving, through the network from a fourth user subsystem that is different from the first user subsystem, the second user subsystem, and the third user subsystem, fourth user subsystem activity data that is associated with a first hashed user identifier;
    performing a hashing operation on at least one of the first user identifier, the second user identifier, or the third user identifier to produce a second hashed user identifier;
    determining that the first hashed user identifier matches the second hashed user identifier; and
    storing, in the non-transitory memory in response to determining that the first hashed user identifier matches the second hashed user identifier, the fourth user subsystem activity data in association with the first user account.

4. The system of claim 1, wherein the operations further comprise:
    receiving a query that includes one of the first user identifier, the second user identifier, or the third user identifier;
    searching, in response to receiving the query, each of the first user subsystem activity data, the second user subsystem activity data, and the third user subsystem activity data that are associated with the first user account in the in the non-transitory memory; and
    returning a result based on the searching.

5. The system of claim 1, wherein the second user resource is a user payment account application and the second user subsystem is a payment subsystem, and wherein the second user subsystem activity data generated in response to the use of the second user subsystem by the user via the second user resource includes at least one use of the payment subsystem by the user for at least one purchase via the user payment account application.

6. The system of claim 1, wherein the second user resource is an Internet browser application and the second user subsystem is a website subsystem, and wherein the second user subsystem activity data generated in response to the use of the second user subsystem by the user via the second user resource includes at least one use of the website subsystem by the user to perform at least one visit to a website via the Internet browser application.

7. A method for profiling a user, comprising:
- receiving, by a system provider device through a network from a first user subsystem, first user subsystem activity data that is associated with a first user identifier and that was generated in response to a use of the first user subsystem by a user via a first user resource;
- determining that the user does not have a user account with an entity associated with the system provider device based on the first user identifier not being associated with any user accounts maintained by the system provider device;
- storing, by the system provider device in a user account database, the first user subsystem activity data as unknown user subsystem activity data with the first user identifier;
- receiving an account creation request from the user, wherein the request comprises at least the first user identifier;
- generating a first user account for the user based on the account creation request and the first user identifier;
- retrieving the first user subsystem activity data based on the first user identifier;
- updating the first user account with the first user subsystem activity data;
- receiving, by the system provider device through the network from a second user subsystem that is different than the first user subsystem, second user subsystem activity data that is associated with the first user identifier and a second user identifier that is different than the first user identifier, wherein the second user subsystem activity data was generated in response to a use of the second user subsystem by the user via a second user resource that is different than the first user resource;
- storing, by the system provider device in the user account database in response to the second user subsystem activity data being associated with the first user identifier, the second user subsystem activity data and the second user identifier in association with the first user account;
- generating, by the system provider device, a user profile using the first user subsystem activity data and the second user subsystem activity data that are associated with the first user account;
- receiving, by the system provider device through the network from a third user subsystem that is different from the first user subsystem and the second user subsystem, third user subsystem activity data that is associated with the first user identifier and a third user identifier that is different from the first user identifier and the second user identifier, wherein the third user subsystem activity data was generated in response to use of the third user subsystem by the user via a third user resource that is different than the first user resource and the second user resource;
- storing, by the system provider device in the user account database in response to the third user subsystem activity data being associated with the first user identifier, the third user subsystem activity data and the third user identifier in association with the first user account; and
- updating, by the system provider device, the user profile to include the third user subsystem activity data associated with the first user account.

8. The method of claim 7, further comprising:
- receiving, by the system provider device through the network from a fourth user subsystem that is different from the first user subsystem, the second user subsystem, and the third user subsystem, fourth user subsystem activity data that is associated with a fourth user identifier;
- storing, by the system provider device in the user account database, the fourth user subsystem activity data; and
- determining, by the system provider device, that the fourth user identifier matches one of the first user identifier, the second user identifier, or the third user identifier and, in response, associating the fourth user identifier with the first user account.

9. The method of claim 7, further comprising:
- receiving, by the system provider device through the network from a fourth user subsystem that is different from the first user subsystem, the second user subsystem, and the third user subsystem, fourth user subsystem activity data that is associated with a first hashed user identifier;
- performing, by the system provider device, a hashing operation on at least one of the first user identifier, the second user identifier, or the third user identifier to produce a second hashed user identifier;
- determining that the first hashed user identifier matches the second hashed user identifier; and
- storing, by the system provider device in the user account database in response to determining that the first hashed user identifier matches the second hashed user identifier, the fourth user subsystem activity data in association with the first user account.

10. The method of claim 7, further comprising:
- receiving, by the system provider device, a query that includes one of the first user identifier, the second user identifier, and the third user identifier;
- searching, by the system provider device in response to receiving the query, each of the first user subsystem activity data, the second user subsystem activity data, and the third user subsystem activity data that are associated with the first user account in the user account database; and
- returning, by the system provider device, a result based on the searching.

11. The method of claim 7, wherein the second user resource is a user payment account application and the second user subsystem is a payment subsystem, and wherein the second user subsystem activity data generated in response to the use of the second user subsystem by the user via the second user resource includes at least one use of the payment subsystem by the user for at least one purchase via the payment account application.

12. The method of claim 7, wherein the second user resource is an Internet browser application and the second user subsystem is a website subsystem, and wherein the second user subsystem activity data generated in response to the use of the second user subsystem by the user via the second user resource includes at least one use of the website subsystem by the user to perform at least one visit to a website via the Internet browser application.

13. The method of claim 7, wherein the first user resource is a third party application and the first user subsystem is a third party service provided by a third party device that is different than the system provider device and the user device, and wherein the first user subsystem activity data generated in response to the use of the first user subsystem by the user via the first user resource includes at least one use of the third party service by the user via the third party application.

14. A non-transitory machine-readable medium having stored thereon machine-readable instructions executable to cause a machine to perform operations comprising:
  receiving, through a network from a first user subsystem, first user subsystem activity data that is associated with a first user identifier and that was generated in response to a use of the first user subsystem by a user via a first user resource;
  determining that the user does not have a user account with an entity associated with a user payment account database based on the first user identifier not being associated with any user accounts in the user payment account database;
  storing, in the user payment account database, the first user subsystem activity data as unknown user subsystem activity data with the first user identifier;
  an account creation request for the first user account from the user, wherein the request comprises at least the first user identifier;
  generating a first user account for the user based on the account creation request and the first user identifier;
  retrieving the first user subsystem activity data based on the first user identifier;
  updating the first user account with the first user subsystem activity data;
  receiving, through the network from a second user subsystem that is different than the first user subsystem, second user subsystem activity data that is associated with the first user identifier and a second user identifier that is different from the first user identifier, wherein the second user subsystem activity data was generated in response to a use of the second user subsystem by the user via a second user resource that is different than the first user resource;
  storing, in the user account database in response to the second user subsystem activity data being associated with the first user identifier, the second user subsystem activity data and the second user identifier in association with the first user account;
  generating a user profile using the first user subsystem activity data and the second user subsystem activity data that are associated with the first user account;
  receiving, through the network from a third user subsystem that is different from the first user subsystem and the second user subsystem, third user subsystem activity data that is associated with the first user identifier and a third user identifier that is different from the first user identifier and the second user identifier, wherein the third user subsystem activity data was generated in response to a use of the third user subsystem by the user via a third user resource that is different than the first user resource and the second user resource;
  storing, in the user account database in response to the third user subsystem activity data being associated with the first user identifier, the third user subsystem activity data and the third user identifier in association with the first user account; and
  updating the user profile to include the third user subsystem activity data associated with the first user account.

15. The non-transitory machine-readable medium of claim 14, wherein the operations further comprise:
  receiving, through the network from a fourth user subsystem that is different from the first user subsystem, the second user subsystem, and the third user subsystem, fourth user subsystem activity data that is associated with a fourth user identifier;
  storing the fourth user subsystem activity data in the user account database; and
  determining that the fourth user identifier matches one of the first user identifier, the second user identifier, or the third user identifier and, in response, associating the fourth user identifier with the first user account.

16. The non-transitory machine-readable medium of claim 14, wherein the operations further comprise:
  receiving, through the network from a fourth user subsystem that is different from the first user subsystem, the second user subsystem, and the third user subsystem, fourth user subsystem activity data that is associated with a first hashed user identifier;
  performing a hashing operation on at least one of the user account identifier, the first user identifier, and the second user identifier to produce a second hashed user identifier;
  determining that the first hashed user identifier matches the second hashed user identifier; and
  storing, in the user account database in response to determining that the first hashed user identifier matches the second hashed user identifier, the fourth user subsystem activity data in association with the first user account.

17. The non-transitory machine-readable medium of claim 14, wherein the operations further comprise:
  receiving a query that includes one of the first user identifier, the second user identifier, and the third user identifier;
  searching, in response to the receiving the query, each of the first user subsystem activity data, the second user subsystem activity data, and the third user subsystem activity data that are associated with the first user account in the user account database; and
  returning a result based on the searching.

18. The non-transitory machine-readable medium of claim 14, wherein the second user resource is a user payment account application and the second user subsystem is a payment subsystem, and wherein the second user subsystem activity data generated in response to the use of the second user subsystem by the user via the second user resource includes at least one use of the payment subsystem by the user for at least one purchase via the user payment account application.

19. The non-transitory machine-readable medium of claim 14, wherein the second user resource is an Internet browser application and the second user subsystem is a website subsystem, and wherein the second user subsystem activity data generated in response to the use of the first user subsystem by the user via the second user resource includes at least one use of the website subsystem by the user to perform at least one visit to a website via the Internet browser application.

20. The non-transitory machine-readable medium of claim 14, wherein the first user resource is a third party application and the first user subsystem is a third party service provided by a third party device, and wherein the first user subsystem activity data generated in response to the use of the first user subsystem by the user via the first user resource includes at least one use of the third party service by the user via the third party application.

\* \* \* \* \*